(12) United States Patent
Edge et al.

(10) Patent No.: US 10,477,340 B2
(45) Date of Patent: Nov. 12, 2019

(54) METHODS AND SYSTEMS FOR ON-DEMAND RESOURCE ALLOCATION FOR LOCATION DETERMINATION OF A MOBILE DEVICE

(71) Applicant: QUALCOMM Incorporated, San Diego, CA (US)

(72) Inventors: Stephen William Edge, Escondido, CA (US); Sven Fischer, Nuremberg (DE); Rayman Pon, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/965,889

(22) Filed: Apr. 28, 2018

(65) Prior Publication Data

US 2019/0037338 A1     Jan. 31, 2019

Related U.S. Application Data

(60) Provisional application No. 62/538,999, filed on Jul. 31, 2017.

(51) Int. Cl.
*H04W 4/02* (2018.01)
*H04W 4/20* (2018.01)
*H04W 84/04* (2009.01)

(52) U.S. Cl.
CPC ............... *H04W 4/02* (2013.01); *H04W 4/20* (2013.01); *H04W 84/042* (2013.01)

(58) Field of Classification Search
CPC ....... H04W 4/02; H04W 64/00; H04W 4/021; H04W 24/10
See application file for complete search history.

(56) References Cited

U.S. PATENT DOCUMENTS

| 7,899,451 | B2 * | 3/2011 | Hu | H04W 48/17 370/328 |
| 2013/0188628 | A1 * | 7/2013 | Lee | H04W 48/14 370/338 |
| 2013/0223626 | A1 * | 8/2013 | Edge | H04W 4/06 380/270 |

(Continued)

OTHER PUBLICATIONS

International Search Report and Written Opinion—PCT/US2018/034054—ISA/EPO—dated Jul. 17, 2018.

*Primary Examiner* — Dung Hong
(74) *Attorney, Agent, or Firm* — Hunter Clark PLLC

(57) ABSTRACT

Techniques described herein are directed to increasing a quantity of location-related information broadcast by wireless nodes. In one embodiment, a user equipment (UE) sends a request to a wireless node for broadcast of an increased quantity of location-related information for a wireless access type and the wireless node broadcasts the increased quantity of location-related information using the wireless access type. The wireless node may transfer the request to other wireless nodes which may similarly broadcast the increased quantity of location-related information using the wireless access type. The UE may receive the increased quantity of location-related information using the wireless access type and may then obtain location information such as a location estimate for the UE. In some embodiments, the increased quantity of location-related information may comprise a positioning reference signal or location assistance data.

28 Claims, 10 Drawing Sheets

(56) References Cited

U.S. PATENT DOCUMENTS

| | | | |
|---|---|---|---|
| 2015/0365790 A1* | 12/2015 | Edge | ..................... H04W 4/90 455/404.2 |
| 2016/0021631 A1 | 1/2016 | Sampath et al. | |
| 2016/0112935 A1* | 4/2016 | Ahuja | ................... H04W 48/16 370/338 |
| 2017/0353971 A1* | 12/2017 | Gupta | ............... H04W 72/1284 |
| 2018/0035448 A1* | 2/2018 | Gupta | ................... H04W 76/14 |
| 2018/0146423 A1* | 5/2018 | Ponnuswamy | ....... H04W 28/18 |
| 2018/0199306 A1* | 7/2018 | Edge | ..................... G01S 19/05 |

* cited by examiner

METHODS AND SYSTEMS FOR ON-DEMAND RESOURCE ALLOCATION FOR LOCATION DETERMINATION OF A MOBILE DEVICE

CROSS-REFERENCE TO RELATED APPLICATIONS

This application claims the benefit of U.S. Provisional Application No. 62/538,999, filed Jul. 31, 2017, entitled "METHODS AND SYSTEMS FOR ON-DEMAND RESOURCE ALLOCATION FOR LOCATION DETERMINATION OF A MOBILE DEVICE," the entire contents of which is hereby incorporated herein by reference.

BACKGROUND

Obtaining the location of a mobile device that is accessing a wireless network may be useful for many applications including, for example, emergency calls, personal navigation, asset tracking, locating a friend or family member, etc. However, location of a mobile device typically requires usage of resources by a mobile device and/or by a network for such purposes as transmitting uplink or downlink signals that can be measured by another device, conveying assistance data that can be used by a mobile device to obtain measurements and/or to determine a location, and performing processing and communication. The amount of resource usage, particularly on a network side, may increase substantially when many mobile devices need to be located over a period of time—e.g. hundreds, thousands or millions of mobile devices that may need to be located hourly or daily by a large wireless network. It may therefore be advantageous to use methods that reduce the amount of resource usage by a network and/or a mobile device to achieve a preferred level of location support.

SUMMARY

In some variations, an example method at first a wireless node for supporting location of a user equipment (UE) is provided. The method includes receiving a first request for broadcast of an increased quantity of location-related information, with the broadcast being based on a wireless access type for the first wireless node, and broadcasting the increased quantity of location-related information using the wireless access type and based on the first request.

Embodiments of the method may include at least some of the features described in the present disclosure, including one or more of the following features. The wireless access type may be, for example, Fifth Generation (5G), New Radio (NR), or Long Term Evolution (LTE). The location-related information may include a Positioning Reference Signal (PRS). The increased quantity of location-related information may include one or more of, for example, an increased PRS bandwidth, an increased frequency of PRS positioning occasions, an increased duration for a PRS positioning occasion, a transmission of PRS using an uplink carrier frequency, or combinations thereof. The method may include sending a second request for the muting of transmission to a second wireless node for the wireless access type, such that the muting of transmission may be based on avoiding radio interference with the broadcast of the increased quantity of location-related information. The location-related information may include location assistance data. The location assistance data may include, for example, assistance data for Observed Time Difference Of Arrival (OTDOA), assistance data for Assisted Global Navigation Satellite System (A-GNSS), assistance data for Real Time Kinematics (RTK), assistance data for Precise Point Positioning (PPP), and/or assistance data for Differential GNSS (DGNSS). The increased quantity of location-related information may include an increased quantity of location assistance data, additional types of location assistance data, an increased frequency of broadcasting location assistance data, and/or an increased repetition of the broadcasting of location assistance data. The first request may be received from a third wireless node. The first request may be received from the UE, in which case the first request may be received using a Radio Resource Control (RRC) protocol for the wireless access type, and/or the first wireless node may be a serving wireless node for the UE based on the wireless access type. The method may further include sending a third request for the broadcast of an increased quantity of location-related information to a fourth wireless node for the wireless access type, with the third request being based on the first request. The method may further include receiving a fourth request from a UE for a termination of the broadcast of the increased quantity of location-related information. When the first request is received from a UE, the method may further include sending a response to the UE, where the response comprises a confirmation of the broadcasting of the increased quantity of location-related information by the first wireless node.

In some variations, a wireless node to support location of a user equipment (UE) is provided. The wireless node includes one or more processors, and a transceiver coupled to the one or more processors. The transceiver is configured to receive a first request for broadcast of an increased quantity of location-related information, with the broadcast being based on a wireless access type for the wireless node, and broadcast the increased quantity of location-related information using the wireless access type and based on the first request.

In some variations, an apparatus, associated with a first wireless node, to support location of a user equipment (UE) is provided. The apparatus includes means for receiving a first request for broadcast of an increased quantity of location-related information, with the broadcast being based on a wireless access type for the first wireless node, and means for broadcasting the increased quantity of location-related information using the wireless access type and based on the first request.

In some variations, a non-transitory computer readable media, associated with a first wireless node, is provided, to support location of a user equipment (UE), that is programmed with instructions, executable on a processor, to receive a first request for broadcast of an increased quantity of location-related information, with the broadcast being based on a wireless access type for the first wireless node, and broadcast the increased quantity of location-related information using the wireless access type and based on the first request.

In some additional variations, another method for supporting location at a user equipment (UE) is provided. The other method includes sending to a first wireless node a first request for broadcast of an increased quantity of location-related information, with the broadcast being based on a wireless access type for the first wireless node, receiving the increased quantity of location-related information broadcast by the first wireless node, with the receiving being based on the wireless access type, and obtaining location information for the UE based, at least in part, on the increased quantity of location-related information.

In some additional variations, a mobile wireless device is provided that includes one or more processors, and a transceiver coupled to the one or more processors. The transceiver is configured to send to a first wireless node a first request for broadcast of an increased quantity of location-related information, with the broadcast being based on a wireless access type for the first wireless node, receive the increased quantity of location-related information broadcast by the first wireless node, with the received increased quantity being based on the wireless access type, and obtain location information for the UE based, at least in part, on the increased quantity of location-related information.

In some variations, an additional apparatus for supporting location at a user equipment (UE) is provided. The apparatus includes means for sending to a first wireless node a first request for broadcast of an increased quantity of location-related information, with the broadcast being based on a wireless access type for the first wireless node, means for receiving the increased quantity of location-related information broadcast by the first wireless node, with the received increased quantity being based on the wireless access type, and means for obtaining location information for the UE based, at least in part, on the increased quantity of location-related information.

In some variations, a non-transitory computer readable media is provided, for supporting location at a user equipment (UE), that is programmed with instructions, executable on a processor, to send to a first wireless node a first request for broadcast of an increased quantity of location-related information, with the broadcast being based on a wireless access type for the first wireless node, receive the increased quantity of location-related information broadcast by the first wireless node, with the received increased quantity being based on the wireless access type, and obtain location information for the UE based, at least in part, on the increased quantity of location-related information.

Embodiments of the wireless node, the wireless mobile device, the user equipment, the apparatus, the non-transitory computer readable media, and the additional method may include at least some of the features described in the present disclosure, including at least some of the features described above in relation to the first method.

Other and further objects, features, aspects, and advantages of the present disclosure will become better understood with the following detailed description of the accompanying drawings.

Figure 1A:
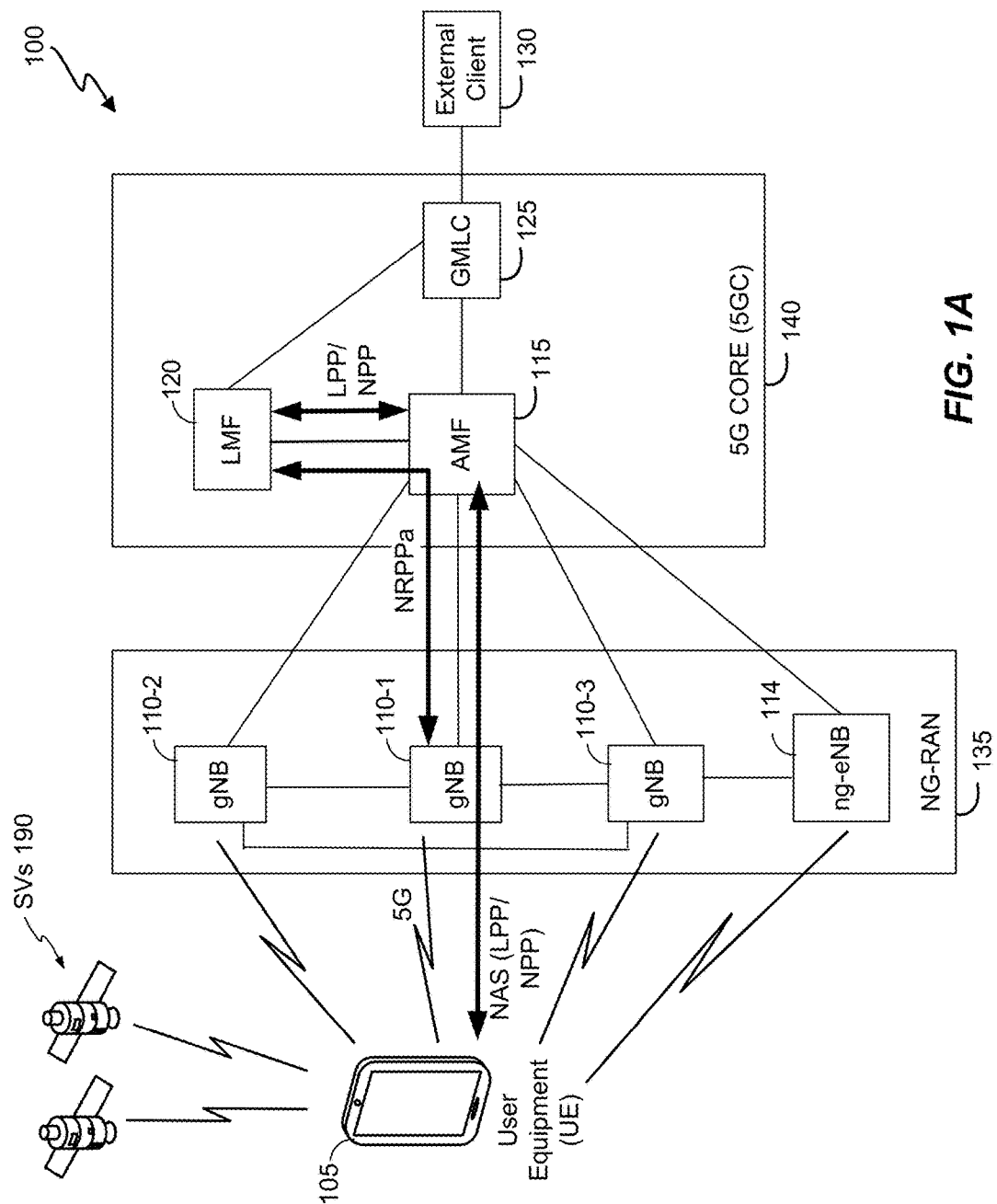
FIG. 1A is a diagram of an example communication system that may utilize a 5G network to determine a position for a mobile device, according to an embodiment.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110a, 110b, 110c etc. When referring to such an element using only the first number, any instance of the element is to be understood (e.g. element 110 in the previous example would refer to elements 110-1, 110-2 and 110-3 or to elements 110a, 110b and 110c).

DETAILED DESCRIPTION

Obtaining the location of a mobile device that is accessing a wireless network may be useful for many applications including, for example, emergency calls, personal navigation, asset tracking, locating a friend or family member, etc. However, location of a mobile device typically requires usage of resources by a mobile device and/or by a network for such purposes as transmitting uplink (UL) or downlink (DL) signals that can be measured by another device, conveying assistance data to a mobile device that can be used to obtain measurements and/or determine a location, and performing processing and communication. The amount of resource usage, particularly on a network side, may increase substantially when many mobile devices need to be located over a period of time—e.g. hundreds, thousands or millions of mobile devices that may need to be located hourly or daily by a large wireless network.

As an example of resource usage by a wireless network, base stations in a wireless network may transmit a positioning reference signal (PRS) continuously in each cell to support, for example, observed time difference of arrival (OTDOA) location determination (e.g., for LTE or 5G access) which may consume significant operator bandwidth. For example, if only used for location of emergency calls, the PRS of any cell may only be measured for a small proportion of transmission time (e.g. 1% or less) if emergency calls occur infrequently within or nearby to any cell. Even when used for other applications (e.g., location of "Internet of Things" (IoT) devices), PRS transmission may not be needed for location for a significant proportion of time. However, reducing the amount of PRS transmission (e.g. the bandwidth or periodicity of PRS) to conserve network resources may result in reduced location accuracy and/or higher latency when location of a mobile device is needed.

A similar problem to that just described for PRS transmission may apply to broadcast of location assistance data by a base station in a cell to assist a user equipment (UE) to obtain location related measurements and/or to determine a location from such measurements. In this case, operator bandwidth may be consumed by broadcasting the assistance data but the broadcast may only be received by UEs for some fraction of the broadcast time. In this case, reducing the frequency of assistance data broadcast to reduce usage of resources may lead to increased latency in acquisition of assistance data by a UE which may lead to higher delay in obtaining a location for a UE or an inability to locate a UE when the delay in obtaining a location exceeds a maximum response time requirement (e.g. such as 30 seconds in the case of location for an emergency call).

Described herein are systems, devices, methods, media and other implementations for on-demand resource allocation for 4G, 5G, and/or other types of communication technologies. The on-demand resource allocation may permit resources to be allocated only, or mainly, when a UE needs to be located and not at other times when no UE needs to be located. For example, in order to avoid wastage of operator bandwidth when PRS-based location is not needed, and to enable more PRS resources to become available when PRS-based location of a UE is needed, on-demand scheduling of PRS may be supported. With on-demand PRS scheduling, UEs may indicate to a network when PRS is needed for location determination. The network can then increase the resource allocation for PRS transmission by increasing the overall duration during which PRS is transmitted (e.g. increasing the number of subframes in each PRS positioning occasion and/or increasing the frequency of PRS positioning occasions in the case of LTE) and/or by increasing the proportion of overall carrier bandwidth assigned to each PRS transmission. While increasing PRS transmission duration may disturb other traffic in some scenarios (e.g. by interfering with other pre-allocated downlink channels like SIBs), increasing PRS bandwidth may interfere less and may improve both measurement accuracy and acquisition of distant base stations. A network, or certain base stations in a network, may also increase the resource allocation for PRS transmission by temporarily reallocating frequency, normally reserved for uplink transmission from UEs, for downlink transmission of PRS during certain specific periods (e.g. during certain subframes). For example, this may be possible using a flexible duplexing capability for 5G New Radio (NR). A similar technique for on-demand scheduling may be applied to resources used for other types of location support such as broadcast of assistance data. In this case, a UE may indicate to a network when broadcast of assistance data needs to be received and, based on the request from a single UE or from many UEs in the same network cell, a base station (BS) may increase the frequency of broadcasting assistance data and/or may increase the transmission power, bandwidth and/or repetition amount for the broadcasting.

While transmission of a PRS to support location of mobile devices is described herein, transmission of other types of signal such as a Cell-specific Reference Signal (CRS) or Tracking Reference Signal (TRS) may be used instead for some wireless technologies (e.g. such as 5G NR). Consequently, methods exemplified herein to support increased resource allocation for PRS transmission may be equally applicable to transmission of other signals used for positioning such as a CRS or TRS.

FIG. 1A shows a diagram of a communication system 100, according to an embodiment. The communication system 100 may be configured to implement on-demand resource allocation based, for example, on requests (e.g., Radio Resource Control (RRC) requests) from individual UEs, to one or more wireless nodes for an increased quantity or capacity of location-related information (e.g., PRS, assistance data, etc.). The receiving wireless node may also generate and communicate, based on the received request, subsequent requests to other nodes for increased on-demand allocation of location-related resources and information.

Here, the communication system 100 comprises a UE 105, and components of a Fifth Generation (5G) network comprising a Next Generation (NG) Radio Access Network (RAN) (NG-RAN) 135 and a 5G Core Network (5GC) 140. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the Third Generation Partnership Project (3GPP). Accordingly, NG-RAN 135 and 5GC 140 may conform to current or future standards for 5G support from 3GPP. The communication system 100 may further utilize information from satellite vehicles (SVs) 190 for a Global Navigation Satellite System (GNSS) like GPS, GLONASS, Galileo or Beidou or some other local or regional Satellite Positioning System (SPS) such as IRNSS, EGNOS or WAAS. Additional components of the communication system 100 are described below. The communication system 100 may include additional or alternative components.

It should be noted that FIG. 1A provides only a generalized illustration of various components, any or all of which may be utilized as appropriate, and each of which may be duplicated or omitted as necessary. Specifically, although only one UE 105 is illustrated, it will be understood that many UEs (e.g., hundreds, thousands, millions, etc.) may utilize the communication system 100. Similarly, the communication system 100 may include a larger (or smaller) number of SVs 190, gNBs 110, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1A illustrates a 5G-based network, similar network implementations and configurations may be used for other communication technologies, such as 3G, Long Term Evolution (LTE), etc. Implementations described herein (be they for 5G technology or for other communication technologies and protocols) may be used to configure, in response to receiving a request, an increased quantity of location-related information or resources associated with broadcast communication from wireless nodes (e.g. broadcast of assistance data), transmission of PRS signals or some other location related function of the wireless nodes.

The UE 105 may comprise and/or be referred to as a device, a mobile device, a wireless device, a mobile terminal, a terminal, a mobile station (MS), a Secure User Plane Location (SUPL) Enabled Terminal (SET), or by some other name. Moreover, UE 105 may correspond to a cellphone, smartphone, laptop, tablet, PDA, tracking device, navigation device, Internet of Things (IoT) device, or some other portable or moveable device. Typically, though not necessarily, the UE 105 may support wireless communication using one or more Radio Access Technologies (RATs) such as using Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G New Radio (NR) (e.g., using the NG-RAN 135 and 5GC 140), etc. The UE 105 may also support wireless communication using a Wireless Local Area Network (WLAN) which may connect to other networks (e.g. the Internet) using a Digital Subscriber Line (DSL) or packet cable for example. The use of one or more of these RATs may allow the UE 105 to communicate with an external client 130 (via elements of 5GC 140 not shown in FIG. 1A, or possibly via a Gateway Mobile Location Center (GMLC) 125) and/or allow the external client 130 to receive location information regarding the UE 105 (e.g., via the GMLC 125).

The UE 105 may include a single entity or may include multiple entities such as in a personal area network where a user may employ audio, video and/or data I/O devices and/or body sensors and a separate wireline or wireless modem. An estimate of a location of the UE 105 may be referred to as a location, location estimate, location fix, fix, position, position estimate or position fix, and may be geographic, thus providing location coordinates for the UE 105 (e.g., latitude and longitude) which may or may not include an altitude component (e.g., height above sea level, height above or depth below ground level, floor level or basement level). Alternatively, a location of the UE 105 may be expressed as a civic location (e.g., as a postal address or the designation of some point or small area in a building such as a particular room or floor). A location of the UE 105 may also be expressed as an area or volume (defined either geographically or in civic form) within which the UE 105 is expected to be located with some probability or confidence level (e.g., 67%, 95%, etc.) A location of the UE 105 may further be a relative location comprising, for example, a distance and direction or relative X, Y (and Z) coordinates defined relative to some origin at a known location which may be defined geographically, in civic terms, or by reference to a point, area, or volume indicated on a map, floor plan or building plan. In the description contained herein, the use of the term location may comprise any of these variants unless indicated otherwise. When computing the location of a UE, it is common to solve for local x, y, and possibly z coordinates and then, if needed, convert the local coordinates into absolute ones (e.g. for latitude, longitude and altitude above or below mean sea level).

Base stations (BSs) in the NG-RAN 135 shown in FIG. 1A comprise NR NodeBs, also referred to as gNBs, 110-1, 110-2 and 110-3 (collectively and generically referred to herein as gNBs 110). Pairs of gNBs 110 in NG-RAN 135 may be connected to one another—e.g. directly as shown in FIG. 1A or indirectly via other gNBs 110. Access to the 5G network is provided to UE 105 via wireless communication between the UE 105 and one or more of the gNBs 110, which may provide wireless communications access to the 5GC 140 on behalf of the UE 105 using 5G NR. 5G NR radio access may also be referred to as NR radio access or as 5G radio access. In FIG. 1A, the serving gNB for UE 105 is assumed to be gNB 110-1, although other gNBs (e.g. gNB 110-2 and/or gNB 110-3) may act as a serving gNB if UE 105 moves to another location or may act as a secondary gNB to provide additional throughout and bandwidth to UE 105.

Base stations (BSs) in the NG-RAN 135 shown in FIG. 1A may also or instead include a next generation evolved Node B, also referred to as an ng-eNB, 114. Ng-eNB 114 may be connected to one or more gNBs 110 in NG-RAN 135—e.g. directly or indirectly via other gNBs 110 and/or other ng-eNBs. An ng-eNB 114 may provide LTE wireless access and/or evolved LTE (eLTE) wireless access to UE 105. Some gNBs 110 (e.g. gNB 110-2) and/or ng-eNB 114 in FIG. 1A may be configured to function as positioning-only beacons, which may transmit signals (e.g. PRS signals) and/or may broadcast assistance data to assist positioning of UE 105 but may not receive signals from UE 105 or from other UEs. It is noted that while only one ng-eNB 114 is shown in FIG. 1A, some embodiments may include multiple ng-eNBs 114.

As will be discussed in greater detail below, in some embodiments, the gNBs 110 and/or ng-eNB 114 (alone or in combination with other modules/units of the communication system 100) may be configured, in response to receiving a request from a UE 105 for an increased quantity of location-related information (e.g., PRS and/or assistance data), to transmit broadcasts containing the location-related information with an increased quantity of resources. As noted, while FIG. 1A depicts nodes configured to communicate according to 5G NR and LTE communication protocols for an NG-RAN 135, nodes configured to communicate according to other communication protocols may be used, such as, for example, an LTE protocol for an Evolved Universal Mobile Telecommunications System (UMTS) Terrestrial Radio Access Network (E-UTRAN) or an IEEE 802.11x protocol for a WLAN. For example, in a 4G Evolved Packet System (EPS) providing LTE wireless access to UE 105, a RAN may comprise an E-UTRAN, which may comprise base stations comprising evolved Node Bs (eNBs) supporting LTE wireless access. A core network for EPS may comprise an Evolved Packet Core (EPC). An EPS may then comprise an E-UTRAN plus EPC, where the E-UTRAN corresponds to NG-RAN 135 and the EPC corresponds to 5GC 140 in FIG. 1A. The methods and techniques described herein for support of on-demand resource allocation for UE 105 positioning may be applicable to such other networks.

The gNBs 110 and ng-eNB 114 can communicate with an Access and Mobility Management Function (AMF) 115, which, for positioning functionality, communicates with a Location Management Function (LMF) 120. The AMF 115 may support mobility of the UE 105, including cell change and handover and may participate in supporting a signaling connection to the UE 105 and possibly data and voice bearers for the UE 105. The LMF 120 may support positioning of the UE 105 when UE accesses the NG-RAN 135 and may support position procedures/methods such as Assisted GNSS (A-GNSS), Observed Time Difference of Arrival (OTDOA), Real Time Kinematics (RTK), Precise Point Positioning (PPP), Differential GNSS (DGNSS), Enhanced Cell ID (ECID), angle of arrival (AOA), angle of departure (AOD), and/or other positioning procedures. The LMF 120 may also process location services requests for the UE 105, e.g., received from the AMF 115 or from the GMLC 125. The LMF 120 may be connected to AMF 115 and/or to GMLC 125. The LMF 120 may be referred to by other names such as a Location Manager (LM), Location Function (LF), commercial LMF (CLMF) or value added LMF (VLMF). In some embodiments, a node/system that implements the LMF 120 may additionally or alternatively implement other types of location-support modules, such as an Enhanced Serving Mobile Location Center (E-SMLC). It is noted that in some embodiments, at least part of the positioning functionality (including derivation of a UE 105's location) may be performed at the UE 105 (e.g., using signal measurements obtained by UE 105 for signals transmitted by wireless nodes such as gNBs 110 and ng-eNB 114, and assistance data provided to the UE 105, e.g. by LMF 120).

The Gateway Mobile Location Center (GMLC) 125 may support a location request for the UE 105 received from an external client 130 and may forward such a location request to the AMF 115 for forwarding by the AMF 115 to the LMF 120 or may forward the location request directly to the LMF 120. A location response from the LMF 120 (e.g. containing a location estimate for the UE 105) may be similarly returned to the GMLC 125 either directly or via the AMF 115, and the GMLC 125 may then return the location response (e.g., containing the location estimate) to the external client 130. The GMLC 125 is shown connected to both the AMF 115 and LMF 120 in FIG. 1A though only one of these connections may be supported by 5GC 140 in some implementations.

As further illustrated in FIG. 1A, the LMF 120 may communicate with the gNBs 110 and/or with the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between a gNB 110 and the LMF 120, and/or between an ng-eNB 114 and the LMF 120, via the AMF 115. As further illustrated in FIG. 1A, LMF 120 and UE 105 may communicate using an LTE Positioning Protocol (LPP), which may be defined in 3GPP TS 36.355. LMF 120 and UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and a serving gNB 110-1 or serving ng-eNB 114 for UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of UE 105 using UE assisted and/or UE based position methods such as A-GNSS, RTK, OTDOA and/or ECID. The NRPPa protocol may be used to support positioning of UE 105 using network based position methods such as ECID (e.g. when used with measurements obtained by a gNB 110 or ng-eNB 114) and/or may be used by LMF 120 to obtain location related information from gNBs 110 and/or ng-eNB 114, such as parameters defining PRS transmission from gNBs 110 and/or ng-eNB 114.

With a UE assisted position method, UE 105 may obtain location measurements and send the measurements to a location server (e.g. LMF 120) for computation of a location estimate for UE 105. For example, the location measurements may include one or more of a Received Signal Strength Indication (RSSI), Round Trip signal propagation Time (RTT), Reference Signal Time Difference (RSTD), Reference Signal Received Power (RSRP), Reference Signal Received Quality (RSRQ), AOA, and/or AOD for gNBs 110, ng-eNB 114 and/or a WLAN access point (AP). The location measurements may also or instead include measurements of GNSS pseudorange, code phase and/or carrier phase for SVs 190. With a UE based position method, UE 105 may obtain location measurements (e.g. which may be the same as or similar to location measurements for a UE assisted position method) and may compute a location of UE 105 (e.g. with the help of assistance data received from a location server such as LMF 120 or broadcast by gNBs 110, ng-eNB 114 or other base stations or APs). With a network based position method, one or more base stations (e.g. gNBs 110 and/or ng-eNB 114) or APs may obtain location measurements (e.g. measurements of RSSI, RTT, RSRP, RSRQ, AOA or Time Of Arrival (TOA)) for signals transmitted by UE 105, and/or may receive measurements obtained by UE 105, and may send the measurements to a location server (e.g. LMF 120) for computation of a location estimate for UE 105.

Information provided by the gNBs 110 and/or ng-eNB 114 to the LMF 120 using NRPPa may include timing and configuration information for PRS transmission and location coordinates. The LMF 120 can then provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things, depending on desired functionality. For example, the LPP or NPP message could contain an instruction for the UE 105 to obtain measurements for GNSS (or A-GNSS), WLAN, and/or OTDOA (or some other position method). In the case of OTDOA, the LPP or NPP message may instruct the UE 105 to obtain one or more measurements (e.g. RSTD measurements) of PRS signals transmitted within particular cells supported by particular gNBs 110 and/or ng-eNB 114 (or supported by some other type of base station such as an eNB or WiFi AP). An RSTD measurement may comprise the difference in the times of arrival at the UE 105 of a signal (e.g. a PRS signal) transmitted or broadcast by one gNB 110 and a similar signal transmitted by another gNB 110. The UE 105 may send the measurements back to the LMF 120 in an LPP or NPP message (e.g. inside a 5G NAS message) via the serving gNB 110-1 (or serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, in some embodiments, 5GC 140 may be connected to a WLAN, either directly or using a Non-3GPP InterWorking Function (N3IWF, not shown FIG. 1A) in the 5GC 140. For example, the WLAN may support IEEE 802.11 WiFi access for UE 105 and may comprise one or more WiFi APs. Here, the N3IWF may connect to the WLAN and to other elements in the 5GC 140 such as AMF 115. In some other embodiments, both the NG-RAN 135 and the 5GC 140 may be replaced by other RANs and other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120 and a GMLC that may be similar to the GMLC 125. In such an EPS, the E-SMLC may use LPPa in place of NRPPa to send and receive location information to and from the eNBs in the E-UTRAN and may use LPP to support positioning of UE 105. In these other embodiments, on-demand resource allocation for positioning of a UE 105 may be supported in an analogous manner to that described herein for a 5G network with the difference that functions and procedures described herein for gNBs 110, ng-eNB 114, AMF 115 and LMF 120 may, in some cases, apply instead to other network elements such eNBs, WiFi APs, an MME and an E-SMLC.

To support certain position methods such as OTDOA and transmission or PRS or other signals used in positioning of a UE 105, base stations may be synchronized. In a synchronized network, the transmission timing of gNBs 110 may be synchronized such that each gNB 110 has the same transmission timing as every other gNB 110 to a high level of precision—e.g. 50 nanoseconds or less. Alternatively, the gNBs 110 may be synchronized at a radio frame or subframe level such that each gNB 110 transmits a radio frame or subframe during the same time duration as every other gNB 110 (e.g. such that each gNB 110 starts and finishes transmitting a radio frame or subframe at almost precisely the same times as every other gNB 110), but does not necessarily maintain the same counters or numbering for radio frames or subframes. For example, when one gNB 110 is transmitting a subframe or radio frame with counter or number zero (which may be the first radio frame or subframe in some periodically repeated sequence of radio frames or subframes), another gNB 110 may be transmitting a radio frame or subframe with a different number or counter such as one, ten, one hundred etc.

Synchronization of the transmission timing of ng-eNBs 114 in NG-RAN 135 may be supported in a similar manner to synchronization of gNBs 110, although since ng-eNBs 114 may typically use a different frequency to gNBs 110 (to avoid interference), an ng-eNB 114 may not always be synchronized to gNBs 110. Synchronization of gNBs 110 and ng-eNBs 114 may be achieved using a GPS receiver or a GNSS receiver in each gNB 110 and ng-eNB 114 or by other means such as using the IEEE 1588 Precision Time Protocol.

In the case of on demand scheduling of PRS, base stations (BSs), such as gNBs 110 and ng-eNB 114 in communication system 100 or eNBs in an EPS, could each transmit a PRS using a low bandwidth and low duration of PRS on a continuous background basis (e.g., using 1 or 2 subframes per positioning occasion and 1.4 MHz bandwidth in the case of eNBs) and temporarily switch to high bandwidth (e.g. 20 MHz) and/or high duration (e.g., 6 subframes per positioning occasion) when requested by UE 105. To support fast switching between low and high PRS resource allocation, a UE 105 request for high PRS resource allocation could be sent using a Radio Resource Control (RRC) protocol to a serving BS for UE 105 (e.g. a serving gNB 110 or ng-eNB 114 for UE 105 access to NG-RAN 135 or a serving eNB for UE 105 access to E-UTRAN). The serving BS may be configured to transfer or communicate the request to neighboring BSs. The request for high PRS resource allocation could be combined with a request by UE 105 for measurement gaps in the case that PRS is transmitted for some cells using a different frequency and/or different RAT to those for the serving cell for UE 105. A location server (e.g. an E-SMLC for EPS or LMF 120 for 5GC 140) could then provide the UE 105 with the background low resource PRS configuration for the reference and neighbor cells for OTDOA positioning and could also indicate whether switching to high PRS resource allocation was supported. In the case that switching to high PRS resource allocation was supported, the location server could indicate the types of increased PRS resource allocation supported such as increased PRS bandwidth, increased PRS subframes per positioning occasion and/or use of UL frequency for PRS transmission. For each supported type of increased PRS resource allocation, the location server could also indicate the available amounts of increased PRS resource allocation such as available (or maximum) PRS bandwidth values, available (or maximum) numbers of PRS subframes per positioning occasion and/or one or more PRS configurations available on an UL carrier frequency.

When switching to high PRS resource allocation is supported, the UE 105 could send an RRC protocol request to the serving BS (e.g. serving eNB for E-UTRAN access or serving gNB 110 or ng-eNB 114 for NG-RAN 135 access), and include, for example, the PRS frequencies the UE 105 is able to measure, the maximum PRS resource allocation the UE 105 can measure (e.g., the maximum PRS bandwidth and/or maximum number of subframes per PRS positioning occasion), whether the UE 105 supports measurements of PRS on an uplink frequency (e.g. an uplink frequency for Frequency Division Duplexing (FDD)), and/or whether measurement gaps are needed. For example, if the location server had indicated to the UE 105 the available amounts of increased PRS resource allocation, the UE 105 could indicate a maximum increased PRS resource allocation, within the available amounts, which the UE 105 is able to measure. The UE 105 may also include the identities of the reference and neighbor cells for OTDOA which may have been previously provided to the UE 105 by a location server (e.g. LMF 120) when requesting OTDOA RSTD measurements from UE 105. The serving BS could then send a request for increased PRS resource allocation (e.g. higher PRS bandwidth, more subframes per PRS positioning occasion, and/or use of PRS broadcast using uplink frequency) to neighbor BSs for the reference and neighbor cells indicated by the UE 105 (and/or to other neighbor BSs able to support an increased allocation of PRS resources). The serving BS could also optionally send an RRC confirmation to the UE 105 to confirm that the UE 105 request for increased PRS resource allocation will be supported and could provide configuration parameters for the increased PRS transmission such as an increased PRS bandwidth, increased number of PRS subframes per positioning occasion, use of particular subframes and bandwidth for an UL frequency, and/or the identities of cells for which the increased PRS transmission will be supported. The UE 105 would then obtain PRS measurements using the increased PRS resource allocation.

If there was no RRC confirmation from the serving BS, the UE 105 could assume that the increased PRS transmission for the high PRS resource allocation will be supported. Alternatively, the UE 105 may measure both a high and a low PRS resource allocation and determine which PRS allocation was used by the network from the accuracy of the resulting RSTD measurements. The low PRS resource allocation may correspond to the PRS resource allocation indicated by the location server (in a previous request for OTDOA RSTD measurements), whereas the high PRS resource allocation may correspond to a high PRS resource allocation indicated by the server as being supported or to a high PRS resource allocation indicated by the UE 105 to the serving BS as being supported by the UE 105. The UE 105 could then assume that low PRS resource allocation was used, and could then use only the RSTD measurements for low PRS resource allocation, when the RSTD measurements for the high PRS resource allocation were found to be less accurate than for the low PRS resource allocation or could not be obtained by the UE 105. Similarly, the UE 105 could assume that high PRS resource allocation was used, and use only the RSTD measurements for high PRS resource allocation, when the RSTD measurements for the low PRS resource allocation were found to be less accurate than for the high resource allocation or could not be obtained by the UE 105. Optionally, after the RSTD measurements were obtained, the UE 105 could send another RRC request to the serving BS to advise that increased PRS resource allocation is no longer needed by UE 105.

To support high resource allocation for PRS with Time Division Duplexing (TDD), increased PRS transmission may be dynamically increased by each base station (e.g. gNB 110 or ng-eNB 114) on a per-slot or per-subframe basis—e.g. by dynamically assigning more DL subframes for PRS transmission by certain gNBs 110 and/or ng-eNBs 114. To support high resource allocation for PRS with FDD, certain uplink subframes at certain gNBs 110 and/or ngeNBs 114 may be temporarily reassigned for downlink PRS transmission. Since (with FDD) the UL frequency would be different to DL frequency used for other PRS transmission, this could improve PRS measurement accuracy by UE 105 due to better frequency diversity. However, involved gNBs 110 and ng-eNBs 114 may need to be time synchronized to avoid interfering with normal UL transmission from UEs in other subframes and a UE 105 may need to be able to receive, acquire and measure PRS on an UL frequency carrier. In addition, cross-link interference with UL signaling and UL data transmitted by UEs outside the cells which use PRS transmission on UL carriers may need to be avoided or reduced—e.g. using cross-link interference management procedures such as an advanced receiver, scheduling coordination, etc. In addition, the maximum power that may be allowed by local regulations for transmission of PRS on uplink frequencies may be much lower than for transmission of PRS on downlink frequencies, which may require that PRS transmission on uplink frequencies is only used by gNBs 110 and ng-eNBs 114 close to a particular target UE 105.

In some implementations, a permanent level of high resource allocation might be used for PRS transmission (e.g. using increased PRS bandwidth, an increased number of PRS subframes per positioning occasion and/or uplink carrier frequency) but only with a long periodicity (e.g. for one positioning occasion every 1 to 5 minutes) which may allow more accurate location for a UE 105 but with increased latency in obtaining and providing the more accurate location to an external client 130.

To support situations where many UEs may be sending requests for increased PRS resource allocation (or sending requests for an increase in other types of location-determination resources, such as assistance data) at around the same time, a serving BS, referred to here as a "Node A", could send one request to a neighbor BS, referred to here as a "Node B", when increased PRS resource allocation is needed for some UE 105, and could include a validity time T (e.g., 1 minute) for this request. The validity time, T, might be set to a higher value (e.g. 2 to 5 minutes) if the Node A had received many requests for increased PRS resource allocation from UEs over a recent short interval. Further, after sending the request for increased PRS resource allocation to Node B, if the Node A receives a request for increased PRS resource allocation from another UE, it may not send another request for increased PRS resource allocation to the Node B if the previous validity time T has not yet expired. When the validity time T expires at Node B, the Node B can switch back to the background low PRS resource allocation. Alternatively, the Node B may combine the requests for increased PRS resource allocation received from all neighbor BSs, as well as local requests for increased PRS resource allocation received from UEs served by Node B and maintain a single validity time T* that expires after all the requested validity times have expired. This technique may reduce signaling among BSs (e.g. among gNBs 110 or among ng-eNBs 114) and may ensure that PRS with high resource allocation is transmitted when needed.

Figure 1B:
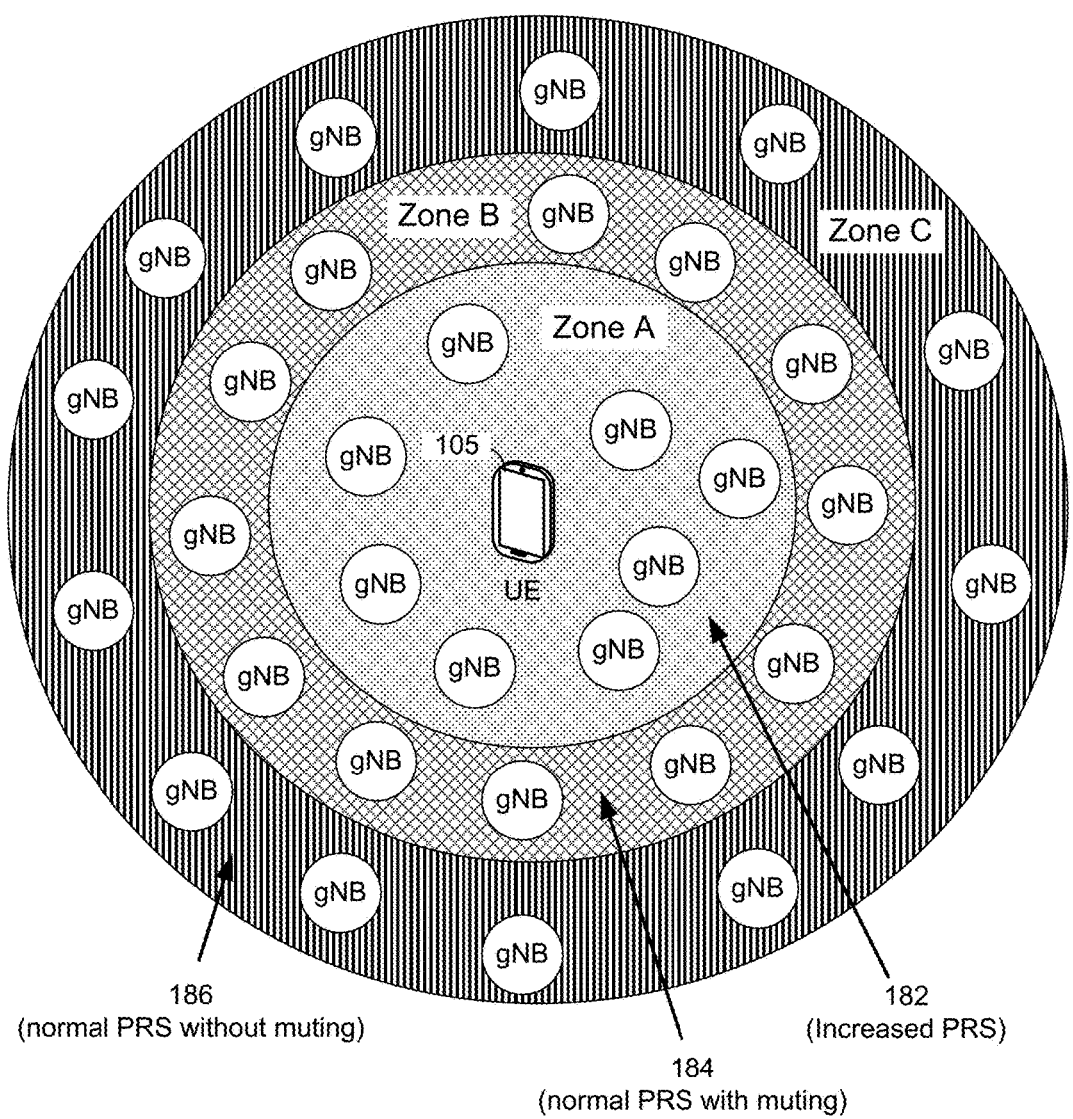
FIG. 1B is a diagram of a zoning technique for increasing PRS transmission in a wireless network.

In an implementation where increased PRS transmission is used to help locate one or more UEs in some local area of a network (e.g. within a collection of neighboring cells), it may be useful to employ techniques to reduce or avoid interference caused by the increased PRS transmission within this local area to other areas of the network. FIG. 1B illustrates one technique to achieve reduced interference using zoning. FIG. 1B may correspond to communication system 100, and shows three concentric zones surrounding a UE 105. In a zone A 182 that includes the UE 105, gNBs (e.g. gNBs 110 in communication system 100) transmit PRS using increased resource allocation. The increased resource allocation may comprise increased PRS bandwidth, additional PRS subframes and/or PRS transmission in subframes for an UL carrier frequency. In a zone B 184 surrounding zone A 182, gNBs (e.g. gNBs 110) and/or UEs employ muting at the times and in the frequency and bandwidth used by the increased PRS transmission for gNBs in zone A 182. For example, gNBs in zone B 184 may not transmit signaling or data using the increased PRS bandwidth (during PRS subframes for gNBs in zone A 182) and/or during any additional PRS subframes used by gNBs in zone A 182, and UEs in zone B 184 may be restricted by gNBs in zone B 184 from transmitting signaling or data in the subframes for an UL carrier frequency used by gNBs in zone A 182 for PRS transmission. This may reduce or avoid interference from gNBs and/or UEs in zone B 184 to the increased PRS transmission in zone A 182 and may also or instead reduce or avoid interference caused by the increased PRS transmission from gNBs in zone A 182 to normal signaling and data transmission from gNBs and/or UEs in zone B 184. In a zone C 186 surrounding zone B 184, gNBs (e.g. gNBs 110) may transmit normal PRS (e.g. at a low resource allocation) and UEs and gNBs in zone C 186 may not employ additional muting (as in zone B 184). The size of zone B 184 (e.g. the difference between the radius of zone B 184 and the radius of zone A 182 when both are circles centered on UE 105) may be sufficient to avoid interference between gNBs in zone A 182 and gNBs and/or UEs in zone C 186. For example, this difference may be approximately 1-5 kilometers (kms) in urban areas and 10-50 kms in rural areas.

In order to support the zoning technique shown in FIG. 1B, a serving gNB 110-1 for UE 105 may determine a first set of gNBs 110 corresponding to zone A 182 and may send a request to each gNB 110 in this first set to broadcast increased PRS as described above. The serving gNB 110-1 for UE 105 may also determine a second set of gNBs 110 corresponding to zone B 184 and may send a request to each gNB 110 in this second set to perform muting and/or to ensure that served UEs perform muting during the times and in the frequency and bandwidth used by the increased PRS transmission for gNBs 110 in zone A 182. The serving gNB 110-1 may also specify the duration (e.g. start time and stop time) for the increased PRS for gNBs 110 in zone A 182 and for the muting for gNBs 110 and UEs in zone B 184.

Similar to on-demand scheduling of PRS, a network may also (or instead) support on-demand broadcast of System Information Blocks (SIBs) for UE based positioning. In this case, one or more SIBs may convey assistance data to a UE 105, which enables the UE 105 to obtain location related measurements for one or more position methods and/or compute a location for the UE 105 using measurements for one or more position methods. For example, assistance data for the A-GNSS position method may convey acquisition assistance data to UE 105 indicating visible SVs and a code sequence, frequency, Doppler shift and/or code phase for a navigation signal transmitted by each visible SV to facilitate code phase (or pseudorange) measurements for the SV, and/or may convey ephemeris and orbital data to UE 105 to facilitate location computation from the code phase (or pseudorange) measurements of SVs. Similarly, assistance data for OTDOA may convey PRS configuration parameters to UE 105 (e.g. PRS frequency, coding, muting sequence, periodicity and/or duration) for cells nearby to UE 105 to facilitate RSTD measurements of PRS signals by UE 105, and/or may convey the locations of BS antennas and PRS timing differences between BSs to UE 105 to facilitate location computation by UE 105 from RSTD measurements of PRS transmissions. In this case, a UE 105 can indicate to a network (e.g. to a BS such as a gNB 110 or ng-eNB 114) when a certain SIB or SIBs are needed for UE positioning. The network (e.g. the serving BS for the UE) can then increase resource allocation for SIB broadcast, e.g. by increasing the frequency of SIB broadcast, the bandwidth allocated to SIB broadcast and/or a repetition rate for SIB broadcast to assist SIB acquisition by a UE 105 at a greater distance from the BS.

On-demand resource allocation for SIB broadcast can apply to individual position methods, e.g., where a UE 105 indicates to the network the position method(s) of interest and the network only increases the resource allocation for SIB broadcast for this (or these) position method(s). A UE 105 (e.g., an IoT UE) may request increased resources for SIB broadcast when requested (e.g., at an application level or by an E-SMLC or an LMF 120) to perform triggered or periodic location over some duration. In this case, the UE 105 can also indicate to the network (e.g. to a serving BS) the expected frequency and/or the duration of the positioning. Support of on-demand broadcast of assistance data could be realized in a similar manner to on-demand PRS scheduling, e.g., with a UE 105 sending an RRC request to a serving BS (e.g. a gNB 110 or ng-eNB 114), and the serving BS then sending a request to neighbor BSs to increase the frequency of SIB broadcast over some validity time T Since a UE 105 may not need to interact with a network when using UE based location, but may still be moving between different cells, requesting and obtaining increased SIB broadcast from neighbor cells, may reduce UE 105 signaling and battery consumption, which may be valuable for IoT UEs.

On-demand broadcast of assistance data and/or on-demand PRS scheduling (or on-demand allocation for other resources) can also be supported by a BS (e.g. an ng-eNB 114 or gNB 110) based on the volume of demand or the priority of demand. For example, a request by a UE 105 for increased resource allocation for PRS or increased resource allocation for assistance data broadcast may only be granted by a BS when many UEs in the same local area request this or when the request is associated with a priority service like an emergency call.

The implementations described herein include a method for supporting location of a user equipment (UE) at a first wireless node, with the method including receiving a first request (e.g., an RRC protocol request) for the broadcast of an increased quantity of location-related information, with the broadcast being based on a wireless access type for the first wireless node (e.g., broadcast of LTE signals, broadcast of 5G NR signals, etc.), and broadcasting the increased quantity of location-related information using the wireless access type and based on the first request. The wireless access type may be one of, for example, Fifth Generation (5G) New Radio (NR), or Long Term Evolution (LTE). The location-related information may include a Positioning Reference Signal (PRS). In such embodiments, the increased quantity of location-related information may include, for example, an increased PRS bandwidth, an increased frequency of PRS positioning occasions, an increased duration for a PRS positioning occasion, and/or a transmission of PRS using an uplink carrier frequency. In some embodiments, the increased quantity of location-related information may include, for example, an increased quantity of location assistance data, an increased frequency of broadcasting location assistance data, and/or an increased repetition of the broadcasting of location assistance data.

Also described herein are systems, devices, methods, media, and other implementations to support location determination, including a method comprising sending (by a wireless mobile device, e.g., a UE 105), to a first wireless node, a first request for broadcast of an increased quantity of location-related information, with the broadcast being based on a wireless access type for the first wireless node, and receiving the increased quantity of location-related information broadcast by the first wireless node, with the receiving being based on the wireless access type. Here too, the wireless access type may include, for example, a Fifth Generation (5G) New Radio (NR) wireless access, Long Term Evolution (LTE) wireless access, etc. The location-related information may include a Positioning Reference Signal (PRS), and in such circumstances the increased quantity of location-related information may include, for example, an increased PRS bandwidth, an increased frequency of PRS positioning occasions, an increased duration for a PRS positioning occasion, and/or a transmission of PRS using an uplink carrier frequency. The location-related information may also include, in some embodiments, location assistance data, such as assistance data for one or more of an Observed Time Difference of Arrival (OTDOA) procedure, an Assisted Global Navigation Satellite System (A-GNSS) procedure, a Real Time Kinematics (RTK) procedure, a Precise Point Positioning (PPP) procedure, and/or a Differential GNSS (DGNSS) procedure. The increased quantity of location-related information may include, for example, an increased quantity of location assistance data, an increased frequency of broadcasting location assistance data, and/or an increased repetition of the broadcasting of location assistance data.

Figure 2:
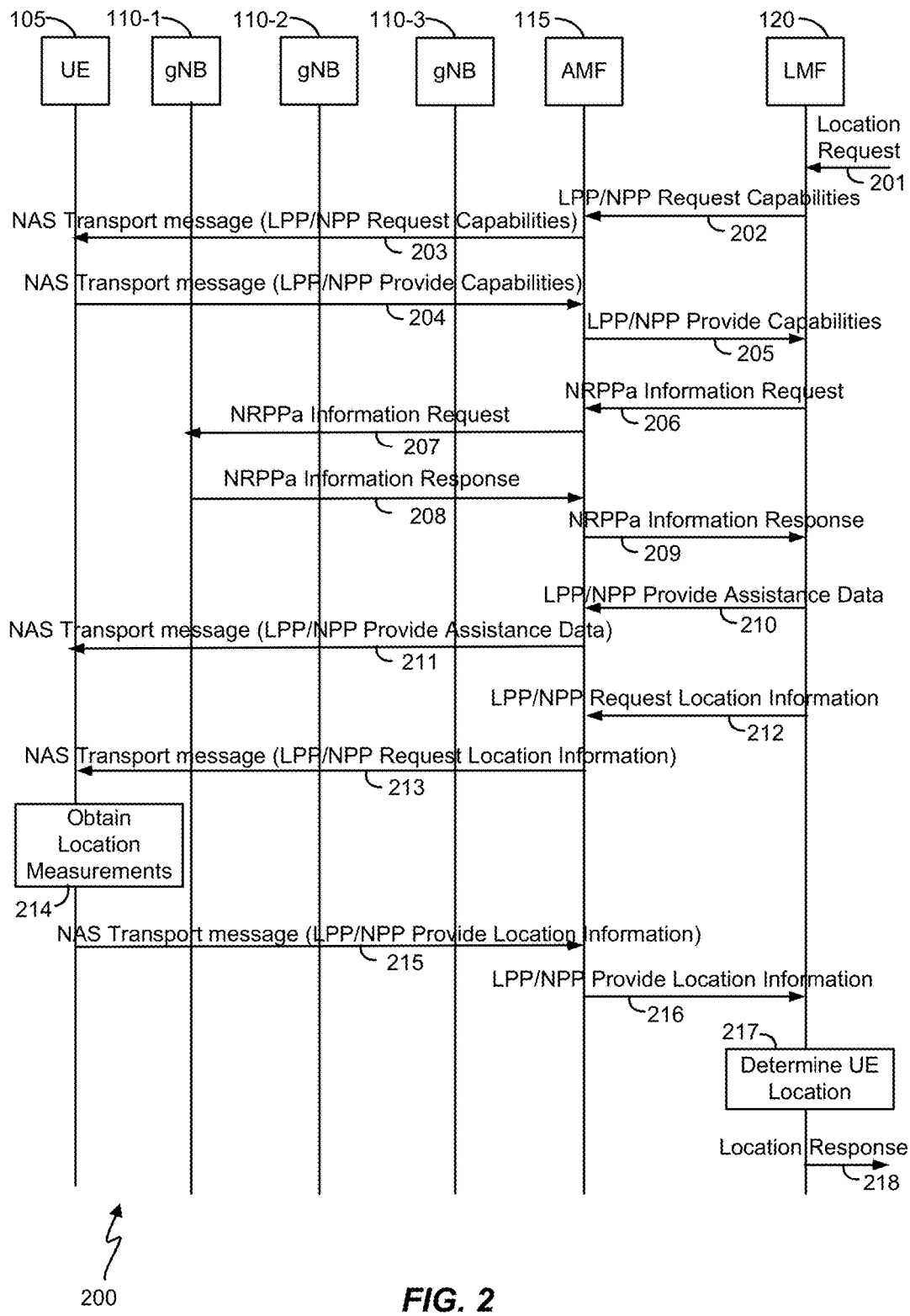
FIG. 2 is a signaling flow diagram showing messages sent between components of a communication network during a location session in accordance with the techniques and methods described herein.

FIG. 2 shows a signaling flow 200 that illustrates various messages sent between components of the communication system 100 depicted in FIG. 1A, during a location session between the UE 105 and the LMF 120. While the flow diagram 200 is discussed, for ease of illustration, in relation to a 5G NR wireless access using gNBs 110, signaling flows similar to FIG. 2 involving ng-eNBs 114 or eNBs rather than gNBs 110 will be readily apparent to those with ordinary skill in the art. Furthermore, in some embodiments, the UE 105 itself may be configured to determine its location using, for example, assistance data provided to it. In the signaling flow 200, it is assumed that the UE 105 and LMF 120 communicate using the LPP and/or NPP positioning protocols referred to earlier. Thus, messages for signaling flow 200 are referred to as LPP/NPP messages which may comprise LPP messages (without use of NPP), NPP messages (without use of LPP) or LPP messages combined with NPP messages (e.g. wherein an NPP message is encapsulated within an LPP message). However, messages for other positioning protocols may also be used in other signaling flows similar to signaling flow 200.

In some embodiments, a location session for UE 105 can be triggered when the LMF 120 receives a location request at action 201. Depending on the scenario, the location request may come to the LMF 120 from the AMF 115, from the GMLC 125 or from the UE 105 (e.g. via the serving gNB 110-1 and the AMF 115) depicted in FIG. 1A. In some implementations, the LMF 120 may then query the AMF 115 for information for the UE 105 and the AMF 115 may then send information for the UE 105 to the LMF 120 (not shown in FIG. 2). The information may indicate that the UE has 5G NR wireless access (for the example embodiments of FIG. 2), and may provide the identity (ID) of a current NR serving cell for the UE 105 (e.g. a cell supported by gNB 110-1 which may be a serving gNB for the UE 105) and/or may indicate that the UE 105 supports location using LPP/NPP. Some or all of this information may have been obtained by the AMF 115 from the UE 105 and/or from the gNB 110-1, e.g., when the UE 105 obtains a signaling link to the AMF 115 and/or registers with the AMF 115. In some other implementations, the same or similar information may be included in a location request sent by AMF 115 to LMF 120 at action 201.

To begin the location session (e.g., and based on an indication of UE support for LPP/NPP with 5G NR wireless access), the LMF 120 sends an LPP/NPP Request Capabilities message at action 202 to the AMF 115 serving the UE 105 (e.g. using a 5G Location Services Application Protocol (LCS AP)). The AMF 115 may include the LPP/NPP Request Capabilities message within a 5G NAS transport message, at action 203, which is sent to the UE 105 (e.g., via the serving gNB 110-1, as illustrated in FIG. 1A). The UE 105 responds to the AMF 115 with an LPP/NPP Provide Capabilities message at action 204, also sent within a 5G NAS transport message. The AMF 115 extracts the LPP/NPP Provide Capabilities message from the 5G NAS transport message and relays the LPP/NPP Provide Capabilities message to the LMF 120 (e.g., using a 5G LCS AP) at action 205. Here, the LPP/NPP Provide Capabilities message sent at actions 204 and 205 may indicate the positioning capabilities of the UE 105 with respect to LPP/NPP, e.g., the LPP and/or NPP position methods and associated LPP and/or NPP assistance data supported by the UE 105 (e.g. such as A-GNSS positioning, OTDOA positioning, ECID positioning, WLAN positioning, etc.) while accessing a 5G NR network. In the case of OTDOA positioning, the capabilities may also indicate if the UE 105 is able to request increased resource allocation for PRS transmission from the serving gNB 110 (or from the serving BS for some other communication technology). For some position methods (e.g. UE based OTDOA, or UE based A-GNSS), the capabilities may also, or instead, indicate if the UE 105 is able to request an increase in resource allocation for location assistance data broadcast. These capabilities may help the LMF 120 determine a suitable position method or methods for the UE 105. For example, in some embodiments, if the UE 105 indicates support for OTDOA and for requesting increased PRS resource allocation from the serving gNB 110, the LMF 120 may select OTDOA positioning, but may not select OTDOA if the UE 105 does not indicate support for requesting increased PRS resource allocation from the serving gNB 110.

Based on the selected position method(s) and the assistance data indicated by the UE 105 as being supported, the LMF 120 may determine assistance data for the UE 105 to support the selected position method(s). The LMF 120 may then send an NRPPa Information Request message at action 206 to AMF 115, which may be relayed to the serving node gNB 110-1 by the AMF 115 at action 207. The NRPPa Information Request may request location-related information for the gNB 110-1, such as the location of the gNB 110-1, PRS configuration parameters for gNB 110-1 and/or information concerning broadcast of assistance data by the gNB 110-1. The serving gNB 110-1 responds with an NRPPa Information Response message, at action 208, which may be relayed to the LMF 120 via the AMF 115 at action 209. The NRPPa Information Response may provide some or all of the requested location-related information such as the PRS transmission configuration parameters for the gNB 110-1 based on a low resource allocation for PRS and may indicate if the gNB 110-1 supports a request for increased PRS resource allocation from the UE 105 and, if so, may include PRS transmission configuration parameters for the gNB 110-1 based on a high PRS resource allocation. Actions 206-209 may be repeated by the LMF 120 to obtain location information (e.g. PRS configuration parameters) from other gNB 110s nearby to UE 105, such as gNBs 110-2 and 110-3 (not shown in FIG. 2).

The LMF 120 then sends some or all of the assistance data received at action 209, and possibly other assistance data already known to the LMF 120 or obtained from other sources (e.g. such as other gNBs 110 or a GNSS or RTK reference station or reference network), to the UE 105. The assistance data is sent in an LPP/NPP Provide Assistance Data message sent to the AMF 115 at action 210, and relayed to the UE 105 in a 5G NAS transport message at action 211. In the case of OTDOA positioning, the assistance data can include the identities of a reference cell and neighbor cells supported by gNBs 110 and may include information for each cell, such as the cell carrier frequency, and PRS configuration parameters for the cell (e.g. including PRS bandwidth, periodicity and duration of PRS positioning occasions, PRS code sequence, PRS muting etc.). The PRS configuration parameters may correspond to a low PRS resource allocation. The assistance data may also indicate whether gNBs 110 support a request for increased PRS resource allocation from UE 105 and, if so, may include PRS configuration parameters for a high or a maximum PRS resource allocation supported by gNBs 110 (e.g. as obtained by LMF 120 at action 209).

The LPP/NPP Provide Assistance Data message sent at actions 210 and 211 can be followed by an LPP/NPP Request Location Information message, again sent from the LMF 120 to the AMF 115, at action 212, which is relayed to the UE 105 in a 5G NAS transport message by the AMF 115 at action 213. The LPP/NPP Request Location Information message may request one or more location measurements from the UE 105 and/or a location estimate according to, for example, the position method(s) selected by LMF 120 based on the position capabilities of UE 105 sent to the LMF 120 at actions 204 and 205. The positioning measurements may for example include Reference Signal Time Difference (RSTD) measurements for OTDOA and/or pseudorange (or code phase) measurements for A-GNSS.

At action 214 the UE 105 can subsequently obtain some or all of the location measurements (and other information such as a location estimate) requested at actions 212 and 213. The location measurements may be made based, at least in part, on PRS signals transmitted by the various cells detected by the UE 105. As discussed herein, PRS transmissions from the reference cell and neighbor cells may have been controllably increased in response to a request from the UE 105, and may be transmitted for a duration that is determined based, at least in part, on a request for an increased quantity of location-related information from the UE 105 and/or another UE (as will be more particularly described below).

In some embodiments, at least some of the location measurements, and/or other the information, obtained by the UE 105 at action 214 are provided in an LPP/NPP Provide Location Information message, which is sent from the UE 105 to the AMF 115 in a 5G NAS transport message at action 215. The AMF 115 extracts the LPP/NPP Provide Location Information message from the 5G NAS transport message, and relays it to the LMF 120 (e.g., using 5G LCS AP) at action 216. With this information, the LMF 120 can then determine the UE location (or determine a location approximation), at block 217, and provide a location response containing the determined location to the requesting entity at action 218. As noted, in some embodiments, at least some of the location determination operations may be performed at the UE 105.

In FIG. 2, the LMF 120 may request the UE 105 to obtain OTDOA RSTD measurements at actions 212 and 213, and the OTDOA RSTD measurements obtained at action 214 may be obtained by measuring PRS signals transmitted from gNBs 110 (e.g. gNBs 110-1, 110-2 and 110-3). If the assistance data provided at actions 210 and 211 is for a low PRS resource allocation and if the gNBs 110 and the UE 105 support a higher PRS resource allocation, the UE 105 may request increased PRS resource allocation from the serving gNB 110-1 before obtaining the location measurements at action 214, as described for FIG. 3.

Figure 3:
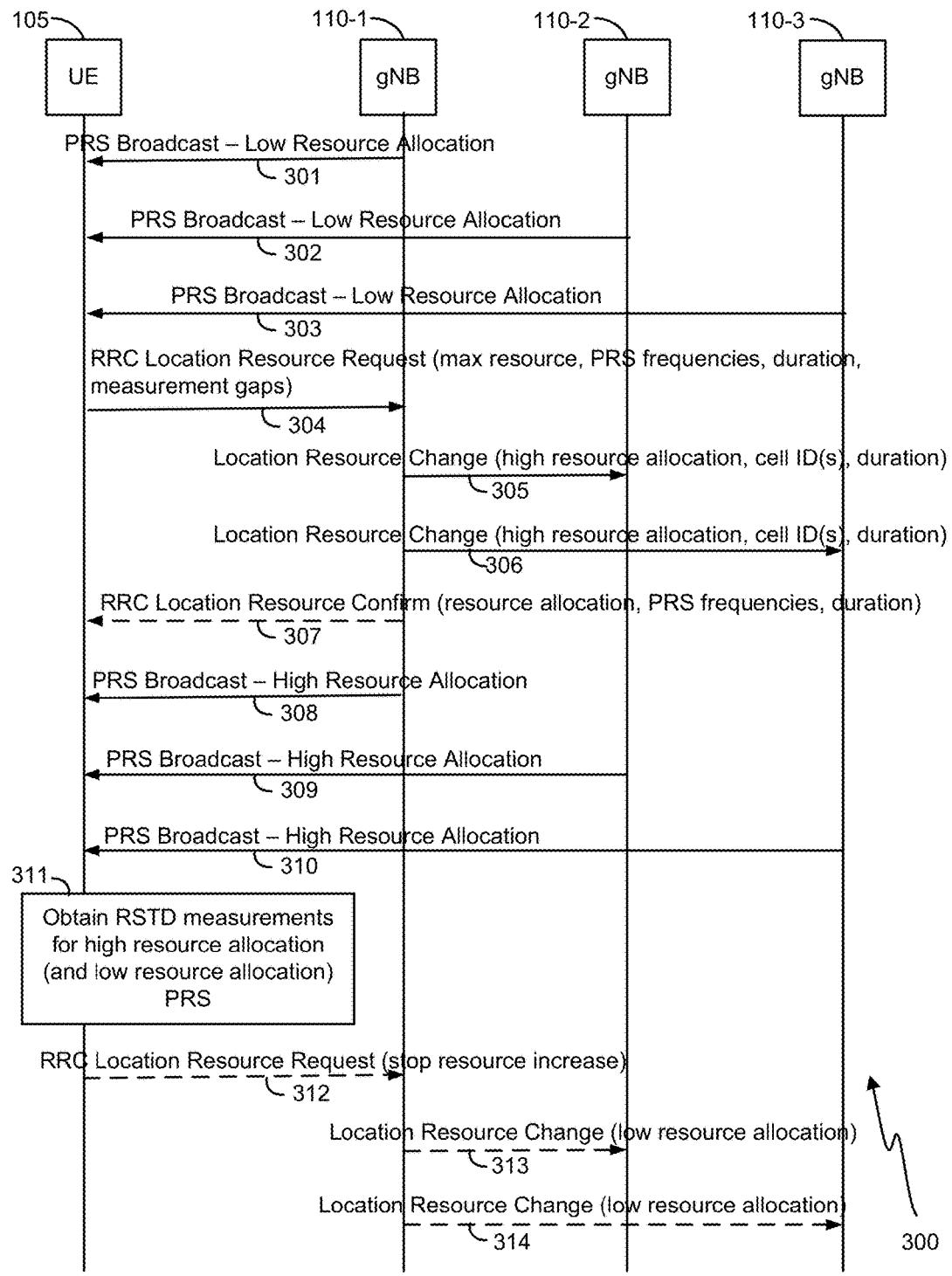
FIG. 3 is a signaling flow diagram illustrating messages communicated between various components of a communication system to allow on demand resource allocation in accordance with the techniques and methods described herein.

FIG. 3 shows a signaling flow 300 illustrating messages communicated between various components of the communication system 100 of FIG. 1A, to allow a UE 105 to request an increased quantity of location-related information (also referred to as positioning-support signaling) from a base station such as a serving gNB 110-1. The signaling exemplifies a mechanism by which a wireless mobile devices (UE) can request increased resources providing location-related information such as PRS transmission, assistance data transmission, etc. Although FIG. 3 depicts an implementation in which the UE 105 requests an increase in PRS resource allocation, a similar or identical procedure may be used by UE 105 to request an increase in resource allocation for other location-related resources, such as an increase in resources (e.g. an increased frequency) for the broadcast of assistance data by gNBs 110 for one or more position methods. Furthermore, while the signaling flow diagram 300 is discussed, for ease of illustration, in relation to 5G NR wireless access using gNBs 110, signaling flows similar to FIG. 3 involving ng-eNBs 114 or eNBs rather than gNBs 110 will be readily apparent to those with ordinary skill in the art. The sequence of actions 301-314 shown in FIG. 3, or a subset or superset of these actions, may be substituted or otherwise employed to support action 214 in signaling flow 200.

Initially (e.g. prior to action 214 in signaling flow 200), gNBs 110-1, 110-2 and 110-3 may transmit (or broadcast), at actions 301, 302, and 303, PRS with a low resource allocation. For example, PRS positioning occasions may be infrequent (e.g., occurring every 512 ms or more), may be of short duration (e.g. 1 or 2 ms) and/or may use low bandwidth (e.g. 1.4 MHz).

Based on the low PRS resource allocation and an indication (e.g. conveyed to UE 105 at actions 210 and 211 in signaling flow 200) that gNBs 110 are configured to support a request for broadcasting an increased quantity of location-related information (in this case, increased PRS transmission), the UE 105 sends, for example, a 5G Radio Resource Control (RRC) request to serving gNB 110-1 at action 304, requesting an increase in resource allocation for PRS. The request may include one or more of the identities of the OTDOA reference and neighbor cells to be measured by the UE 105, the maximum PRS resource allocation requested by or supported by the UE 105 (e.g. the maximum PRS bandwidth, the maximum duration of a PRS positioning occasion that can be measured by the UE 105, and/or whether UE 105 is able to measure PRS transmitted on an uplink carrier frequency), the PRS carrier frequencies to be measured by the UE 105, an expected duration of PRS measurements, and/or a request for measurement gaps. An additional indication of the capabilities of the UE to process location-related information may also be included in the RRC request transmitted at the action 304. In some embodiments, the RRC request sent at action 304 may include a high or a maximum PRS resource allocation indicated, to UE 105 by LMF 120 at actions 210 and 211, as being supported by gNBs 110 (e.g. if this high or maximum PRS resource allocation does not exceed the maximum PRS resource allocation supported by UE 105).

At actions 305 and 306, the gNB 110-1 may send a request message, such as a Location Resource Change request, to the gNBs 110-2 and 110-3, respectively, (and possibly to other gNBs 110 not shown in FIG. 3) requesting an increase in resource allocation for PRS transmission. The request may include the increased PRS resource allocation to be used (e.g. an increased PRS bandwidth, increased duration of PRS positioning occasions, a higher frequency of PRS positioning occasions, and/or use of UL carrier frequency for PRS transmission), the cell ID(s) to which this applies and/or the duration of increased PRS resource allocation. The increased PRS resource allocation may be based on the maximum PRS resource allocation requested by, or indicated as being supported by, the UE 105 at action 304 (e.g., it may be equal to or less than the maximum PRS resource allocation requested by, or indicated as supported by, the UE 105). The gNB 110-1 may select gNBs 110-2 and 110-3 (and other gNBs 110 not shown in FIG. 3, and/or other base stations of different types such as ng-eNBs 114), as well as indicate particular cell IDs for the gNBs 110-2 and 110-3 based on any of: (i) the identities of reference and neighbor cells to be measured by the UE 105 if provided by the UE 105 at the action 304, (ii) cells nearby to the UE 105 and/or nearby to the serving cell for the UE 105, and/or (iii) the PRS carrier frequencies to be measured as indicated by the UE at action 304.

In implementations where the zoning technique described in association with FIG. 1B is supported, the gNB 110-1 may send a Location Resource Change request to one or more other gNBs 110 (not shown in FIG. 3) requesting muting of transmission during the increased PRS transmission by gNBs 110-1, 110-2, 110-3 (and any other gNBs 110 supporting increase PRS transmission at the request of gNB 110-1). The request to perform muting may indicate the increased PRS resource allocation for which corresponding muting is requested (e.g. an increased PRS bandwidth, increased duration of PRS positioning occasions, higher frequency of PRS positioning occasions, and/or use of UL carrier frequency for PRS transmission), and may further include the cell ID(s) to which the muting applies and/or the duration of muting. The gNBs 110 for which muting is requested may be selected by the gNB 110-1 based on a determination of the size of a zone B 184 as described for FIG. 1B that may be needed to prevent interference between gNBs 110 transmitting the increased PRS (e.g. such as gNBs 110-1, 110-2, 110-3 and other gNBs 110 for the zone A 182 in FIG. 1B) and other gNBs 110 and UEs (e.g. for the zone C 186 in FIG. 1B) for which normal PRS transmission (without muting or increased PRS transmission) is used.

The gNB 110-1 may optionally send a confirmation (e.g. an RRC confirmation) to the UE 105, at action 307, that PRS resource allocation will be increased, and may indicate the increased PRS resource allocation (e.g., may indicate the increased PRS bandwidth, increased duration of PRS positioning occasions, higher frequency of PRS positioning occasions, and/or whether PRS transmission using UL frequency will be used) and optionally the cells or PRS frequencies to which this applies. In response to the request at action 304 (in the case of gNB 110-1), or in response to the requests at actions 305 and 306 (in the case of gNBs 110-2 and 110-3, respectively), gNBs 110-1, 110-2 and 110-3 may increase PRS resource allocation and transmit PRS with the increased resource allocation at actions 308, 309 and 310, respectively.

The UE 105 may subsequently obtain RSTD measurements at action 311 for the PRS transmissions for actions 308-310. If a confirmation was sent at action 307 or if the UE 105 is configured to assume a confirmation even when not sent, the UE 105 may obtain RSTD measurements only for the increased PRS resource allocation transmitted at actions 308-310. If the optional confirmation at action 307 was not sent, the UE 105 may in an alternative aspect obtain RSTD measurements for both the increased PRS resource allocation that may be transmitted at actions 308-310 and the original low PRS allocation transmitted at actions 301-303. With the alternative aspect, if the UE 105 succeeds in obtaining accurate RSTD measurements for the increased PRS resource allocation, the RSTD measurements for the lower resource allocation may be discarded. Conversely, if the UE 105 is unable to obtain RSTD measurements or accurate RSTD measurements for the increased PRS resource allocation, the UE 105 may assume that the increased PRS resource allocation was not assigned by the gNB 110-1 and may discard any RTSD measurements for the increased PRS resource allocation, and retain only the RSTD measurements for the low PRS resource allocation. In some embodiments, UE 105 may perform this determination (between measuring low versus high PRS resource allocation) on a cell by cell basis rather than for all cells, e.g. if increased PRS resource allocation may be supported by some but not by all gNBs 110.

At action 312, the UE 105 can optionally send, for example, an RRC Location Resource Request to the serving gNB 110-1 indicating that the increased PRS resource allocation is no longer needed. Based on this request (e.g., if there are no other UEs that need increased PRS resource allocation), the gNB 110-1 may optionally send, for example, a Location Resource Change request to the gNBs 110-2 and 110-3 at actions 313 and 314, respectively, indicating that increased PRS resource allocation is no longer needed. The gNBs 110-1, 110-2 and 110-3 may then reduce PRS resource allocation and resume transmitting PRS as at actions 301, 302 and 303, respectively. The UE 105 may also be configured to then include the RSTD measurements obtained at the action 311 in an LPP/NPP Provide Location Information message which may be sent to LMF 120 via AMF 115 (e.g., similar to or the same as the transmission performed at action 215 in signaling flow 200).

In the event that there is a cell change or handover of UE 105 to a new serving gNB 110 following action 304 (or action 307), UE 105 may send the request at action 312 to the new serving gNB 110, and the new serving gNB 110 may send the requests at actions 313 and 314 to other gNBs 110 (e.g. which may include gNBs 110-2 and 110-3) indicating that increased PRS resource allocation is no longer needed.

Figure 4:
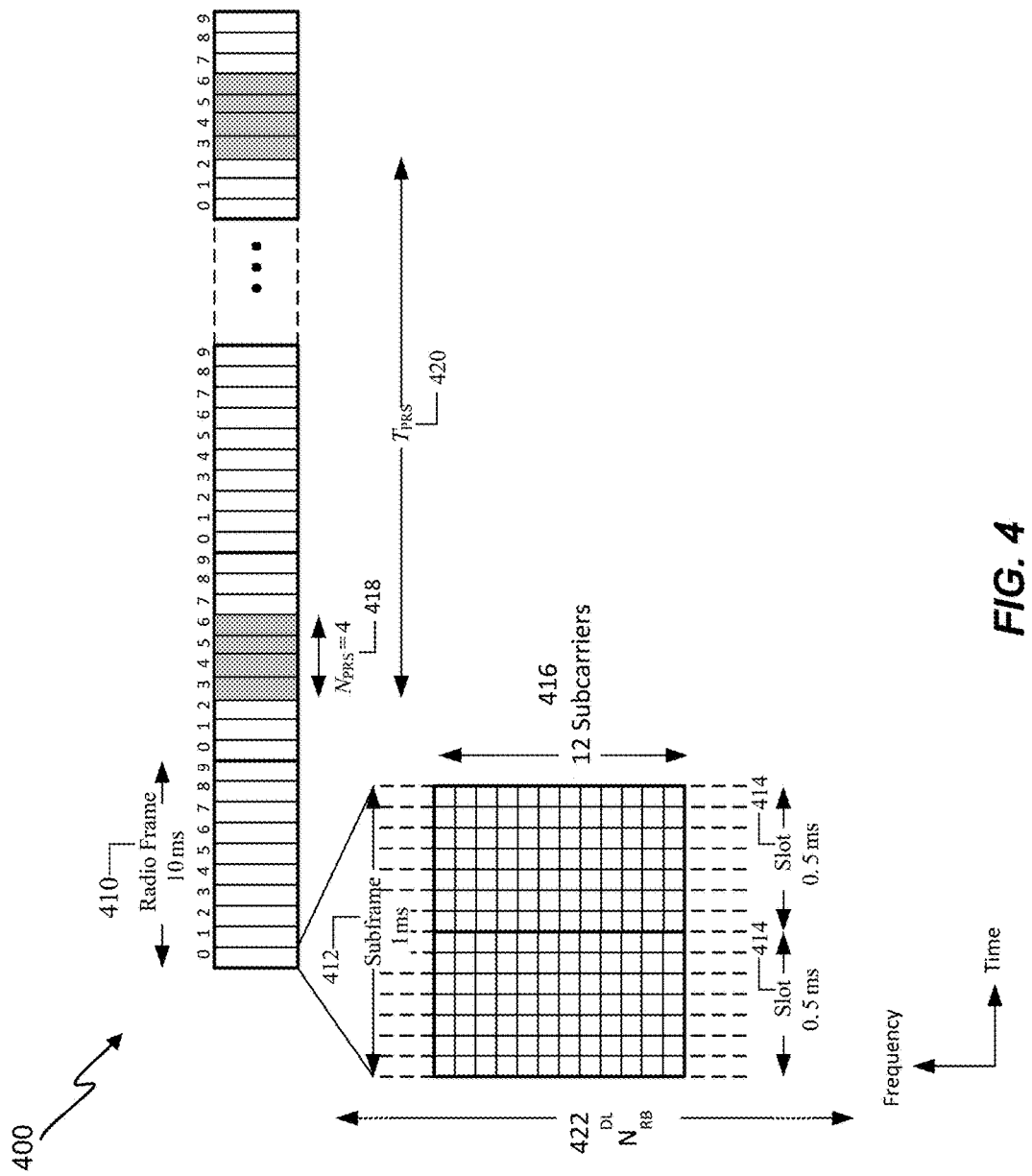
FIG. 4 is a diagram of a structure of an example LTE subframe sequence with PRS positioning occasions.

FIG. 4 shows a structure of an example LTE subframe sequence 400 with PRS positioning occasions. While FIG. 4 provides an example of a subframe sequence for LTE in association with an EPS, similar or identical subframe sequence implementations may be realized for other communication technologies/protocols, such as 5G NR. For example, support of PRS transmission by a gNB 110 or ng-eNB 114 in communication system 100 may be similar or identical to that described for LTE in an EPS with reference to FIGS. 4 and 5. In FIG. 4, time is represented horizontally (e.g., on an X axis) with time increasing from left to right, while frequency is represented vertically (e.g., on a Y axis) with frequency increasing (or decreasing) from bottom to top. As shown in FIG. 4, downlink and uplink LTE Radio Frames 410 may be of 10 milliseconds (ms) duration each. For downlink Frequency Division Duplexing (FDD) mode, Radio Frames 410 are organized, in the illustrated embodiments, into ten subframes 412 of 1 ms duration each. Each subframe 412 comprises two slots 414, each of, for example, 0.5 ms duration.

In the frequency domain, the available bandwidth may be divided into uniformly spaced orthogonal subcarriers 416. For example, for a normal length cyclic prefix using, for example, 15 kHz spacing, subcarriers 416 may be grouped into a group of twelve (12) subcarriers. Each grouping, which comprises the 12 subcarriers 416, is termed a resource block and, in the example above, the number of subcarriers in the resource block may be written as $N_{SC}^{RB}=12$. For a given channel bandwidth, the number of available resource blocks on each channel 422, which is also called the transmission bandwidth configuration 422, is indicated as $N_{RB}^{DL}$. For example, for a 3 MHz channel bandwidth in the above example, the number of available resource blocks on each channel 422 is given by $N_{RB}^{DL}=15$.

In the communication system 100 illustrated in FIG. 1A, a gNB 110, such as any of the gNBs 110-1, 110-2, or 110-3, or an ng-eNB 114 may transmit frames, or other physical layer signaling sequences, supporting PRS signals (i.e. a downlink (DL) PRS) according to frame configurations similar or identical to that shown in FIG. 4 and (as described later) in FIG. 5, which may be measured and used for UE (e.g., UE 105) position determination. As noted, other types of wireless nodes and base stations may also be configured to transmit PRS signals configured in a manner similar to that depicted in FIGS. 4 and 5. Since transmission of a PRS by a wireless node or base station is directed to all UEs within radio range, a wireless node or base station can also be considered to transmit (or broadcast) a PRS.

A PRS, which has been defined in 3GPP LTE Release-9 and later releases, may be transmitted by wireless nodes (e.g. eNBs) after appropriate configuration (e.g., by an Operations and Maintenance (O&M) server). A PRS may be transmitted in special positioning subframes (also referred to as PRS subframes) that are grouped into positioning occasions (also referred to as PRS positioning occasions). For example, in LTE, a PRS positioning occasion can comprise a number $N_{PRS}$ of consecutive positioning subframes where the number $N_{PRS}$ may be between 1 and 160 (e.g. may include the values 1, 2, 4 and 6 as well as other values). The PRS positioning occasions for a cell supported by a wireless node may occur periodically at intervals, denoted by a number $T_{PRS}$, of millisecond (or subframe) intervals where $T_{PRS}$ may equal 5, 10, 20, 40, 80, 160, 320, 640, or 1280 (or any other appropriate value). As an example, FIG. 4 illustrates a periodicity of positioning occasions where $N_{PRS}$ 418 equals 4 and $T_{PRS}$ 420 is greater than or equal to 20. In some embodiments, $T_{PRS}$ may be measured in terms of the number of subframes between the start of consecutive positioning occasions.

Within each positioning occasion, a PRS may be transmitted with a constant power. A PRS can also be transmitted with zero power (i.e., muted). Muting, which turns off a regularly scheduled PRS transmission, may be useful when PRS signals between different cells overlap by occurring at the same or almost the same time. In this case, the PRS signals from some cells may be muted while PRS signals from other cells are transmitted (e.g. at a constant power). Muting may aid signal acquisition and RSTD measurement, by UEs (such as the UE 105 depicted in FIGS. 1A-3), of PRS signals that are not muted (by avoiding interference from PRS signals that have been muted). Muting may be viewed as the non-transmission of a PRS for a given positioning occasion for a particular cell. Muting patterns may be signaled (e.g. using LPP or NPP) to a UE 105 using bit strings. For example, in a bit string signaling a muting pattern, if a bit at position j is set to '0', then the UE 105 may infer that the PRS is muted for a $j^{th}$ positioning occasion.

To further improve hearability of PRS, positioning subframes may be low-interference subframes that are transmitted without user data channels. As a result, in ideally synchronized networks, PRSs may receive interference from other cell PRSs with the same PRS pattern index (i.e., with the same frequency shift), but not from data transmissions. The frequency shift, in LTE, for example, is defined as a function of a PRS ID (denoted as $N_{ID}^{PRS}$) for a cell or Transmission Point (TP) or as a function of a Physical Cell Identifier (PCI) (denoted as $N_{ID}^{cell}$) if no PRS ID is assigned, which results in an effective frequency re-use factor of 6, as described in 3GPP TS 36.211.

To also improve hearability of a PRS (e.g., when PRS bandwidth is limited such as with only 6 resource blocks corresponding to 1.4 MHz bandwidth), the frequency band for consecutive PRS positioning occasions (or consecutive PRS subframes) may be changed in a known and predictable manner via frequency hopping. In addition, a cell supported by a wireless node may support more than one PRS configuration, where each PRS configuration comprises a distinct sequence of PRS positioning occasions with a particular number of subframes ($N_{PRS}$) per positioning occasion and a particular periodicity ($T_{PRS}$). Further enhancements of a PRS may also be supported by a wireless node.

As discussed herein, in some embodiments, OTDOA assistance data may be provided to a UE 105 by a location server (e.g., the LMF 120 of FIG. 1A, an E-SMLC, etc.) for a "reference cell" and one or more "neighbor cells" or "neighboring cells" relative to the "reference cell." For example, the assistance data may provide the center channel frequency of each cell, various PRS configuration parameters (e.g., $N_{PRS}$, $T_{PRS}$, muting sequence, frequency hopping sequence, code sequence, PRS ID, PRS bandwidth), a cell global ID, and/or other cell related parameters applicable to OTDOA or some other positioning procedure.

PRS-based positioning by a UE 105 may be facilitated by indicating the serving cell for the UE 105 in the OTDOA assistance data (e.g. with the reference cell indicated as being the serving cell). In the case of a UE 105 with 5G NR wireless access, the reference cell may be chosen by the LMF 120 as some cell with good coverage at the expected approximate location of the UE 105 (e.g., as indicated by the known 5G NR serving cell for the UE 105).

In some embodiments, OTDOA assistance data may also include "expected RSTD" parameters, which provide the UE 105 with information about the RSTD values the UE 105 is expected to measure at its current location between the reference cell and each neighbor cell, together with an uncertainty of the expected RSTD parameter. The expected RSTD, together with the associated uncertainty, define a search window for the UE 105 within which the UE 105 is expected to measure the RSTD value. OTDOA assistance information may also include PRS configuration information parameters, which allow the UE 105 to determine when a PRS positioning occasion occurs on signals received from various neighbor cells relative to PRS positioning occasions for the reference cell, and to determine the PRS sequence transmitted from various cells in order to measure a signal Time of Arrival (TOA) or RSTD.

Using the RSTD measurements, the known absolute or relative transmission timing of each cell, and the known position(s) of wireless node physical transmitting antennas for the reference and neighboring cells, the UE 105's position may be calculated (e.g., by the UE 105, by the LMF 120, or by some other node). More particularly, the RSTD for a cell "k" relative to a reference cell "Ref", may be given as ($TOA_k$-$TOA_{Ref}$). TOA measurements for different cells may then be converted to RSTD measurements (e.g. as defined in 3GPP TS 36.214 entitled "Physical layer; Measurements") and sent to the location server (e.g., the LMF 120 or an E-SMLC) by the UE 105. Using (i) the RSTD measurements, (ii) the known absolute or relative transmission timing of each cell, and (iii) the known position(s) of physical transmitting antennas for the reference and neighboring cells, the UE 105's position may be determined.

Figure 5:
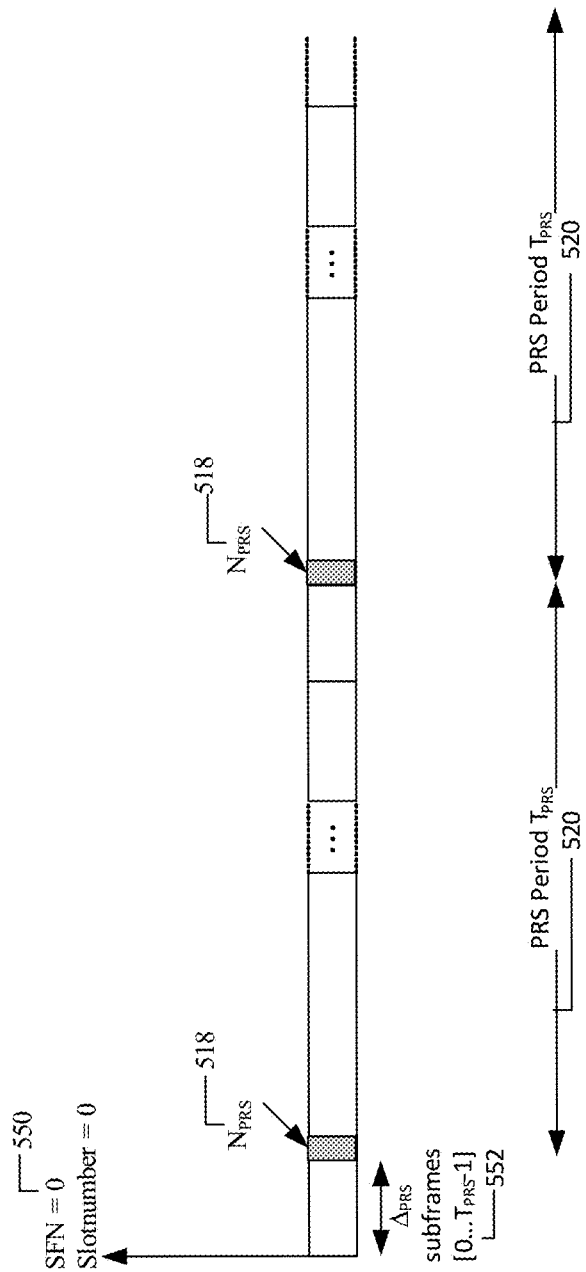
FIG. 5 is a diagram illustrating further aspects of PRS transmission for a cell supported by a wireless node.

FIG. 5 illustrates further aspects of PRS transmission for a cell supported by a wireless node (such as an eNB, gNB 110 or ng-eNB 114). Again, PRS transmission for LTE in an EPS is assumed in FIG. 5 although the same or similar aspects of PRS transmission to those shown in and described for FIG. 5 may apply to 5G NR support by a gNB 110, LTE support by an ng-eNB 114 and/or other wireless technologies. FIG. 5 shows how PRS positioning occasions are determined by a System Frame Number (SFN), a cell specific subframe offset ($\Delta_{PRS}$) and the PRS Periodicity ($T_{PRS}$) 520. Typically, the cell specific PRS subframe configuration is defined by a "PRS Configuration Index" $I_{PRS}$ included in the OTDOA assistance data. The PRS Periodicity ($T_{PRS}$) 520 and the cell specific subframe offset ($\Delta_{PRS}$) are defined based on the PRS Configuration Index $I_{PRS}$, in 3GPP TS 36.211 entitled "Physical channels and modulation," as illustrated in Table 1 below.

TABLE 1

| PRS configuration Index $I_{PRS}$ | PRS periodicity $T_{PRS}$ (subframes) | PRS subframe offset $\Delta_{PRS}$ (subframes) |
|---|---|---|
| 0-159 | 160 | $I_{PRS}$ |
| 160-479 | 320 | $I_{PRS}$-160 |
| 480-1119 | 640 | $I_{PRS}$-480 |
| 1120-2399 | 1280 | $I_{PRS}$-1120 |
| 2400-2404 | 5 | $I_{PRS}$-2400 |
| 2405-2414 | 10 | $I_{PRS}$-2405 |
| 2415-2434 | 20 | $I_{PRS}$-2415 |
| 2435-2474 | 40 | $I_{PRS}$-2435 |
| 2475-2554 | 80 | $I_{PRS}$-2475 |
| 2555-4095 | Reserved | |

A PRS configuration is defined with reference to the System Frame Number (SFN) of a cell that transmits PRS. PRS instances, for the first subframe of the $N_{PRS}$ downlink subframes comprising a first PRS positioning occasion, may satisfy:

$$(10 \times n_f + \lfloor n_s/2 \rfloor - \Delta_{PRS}) \bmod T_{PRS} = 0 \quad (1)$$

where $n_f$ is the SFN with $0 \leq n_f \leq 1023$, $n_s$ is the slot number within the radio frame defined by $n_f$ with $0 \leq n_s \leq 19$, $T_{PRS}$ is the PRS periodicity, and $\Delta_{PRS}$ is the cell-specific subframe offset.

As shown in FIG. 5, the cell specific subframe offset $\Delta_{PRS}$ 552 may be defined in terms of the number of subframes transmitted starting from System Frame Number 0 (Slot 'Number 0', marked as slot 550) to the start of the first (subsequent) PRS positioning occasion. In FIG. 5, the number of consecutive positioning subframes 518 ($N_{PRS}$) equals 4.

In some embodiments, when a UE 105 receives a PRS configuration index $I_{PRS}$ in the OTDOA assistance data for a particular cell, the UE 105 may determine the PRS periodicity $T_{PRS}$ and PRS subframe offset $\Delta_{PRS}$ using Table 1. The UE 105 may then determine the radio frame, subframe and slot when a PRS is scheduled in the cell (e.g., using equation (1)). The OTDOA assistance data may be determined by, for example, the LMF 120 or an E-SMLC and includes assistance data for a reference cell, and a number of neighbor cells supported by various wireless nodes (e.g. eNBs, gNBs 110 or ng-eNBs 114).

Typically, PRS occasions from all cells in a network that use the same frequency are aligned in time and may have a fixed known time offset relative to other cells in the network that use a different frequency. In SFN-synchronous networks all wireless nodes (gNBs 110, ng-eNBs 114, eNBs, etc.) may be aligned on both frame boundary and system frame number. Therefore, in SFN-synchronous networks all cells supported by the various wireless nodes may use the same PRS configuration index for any particular frequency of PRS transmission. On the other hand, in SFN-asynchronous networks, the various wireless nodes may be aligned on a frame boundary, but not system frame number. Thus, in SFN-asynchronous networks the PRS configuration index for each cell may be configured separately by the network so that PRS occasions align in time.

A UE 105 may determine the timing of the PRS occasions (e.g., in an LTE network or a 5G NR network such as that in communication system 100) of the reference and neighbor cells for OTDOA positioning, if the UE 105 can obtain the cell timing (e.g., SFN or Frame Number) of at least one of the cells, e.g., the reference cell or a serving cell (which may be performed at action 214 of FIG. 2, or action 311 of FIG. 3). The timing of the other cells may then be derived by the UE 105 based, for example, on the assumption that PRS occasions from different cells overlap.

As defined by 3GPP (e.g., in 3GPP TS 36.211), for LTE systems, the sequence of subframes used to transmit PRS (e.g., for OTDOA positioning) may be characterized and defined by a number of parameters, as described previously, comprising: (i) a reserved block of bandwidth (BW); (ii) the configuration index $I_{PRS}$; (iii) the duration $N_{PRS}$; (iv) an optional muting pattern; and (v) a muting sequence periodicity $T_{REP}$ which can be implicitly included as part of the muting pattern in (iv) when present. In some cases, with a fairly low PRS duty cycle, $N_{PRS}=1$, $T_{PRS}=160$ subframes (equivalent to 160 ms), and BW=1.4, 3, 5, 10, 15 or 20 MHz. To increase the PRS duty cycle, the $N_{PRS}$ value can be increased to six (i.e., $N_{PRS}=6$) and the bandwidth (BW) value can be increased to the system bandwidth (i.e., BW=LTE system bandwidth in the case of LTE). An expanded PRS with a larger $N_{PRS}$ (e.g., greater than six) and/or a shorter $T_{PRS}$ (e.g., less than 160 ms), up to the full duty cycle (i.e., $N_{PRS}=T_{PRS}$), may also be used in later versions of LPP according to 3GPP TS 36.355.

Increasing the resource allocation for PRS when requested by a UE 105 (e.g. as exemplified with respect to FIGS. 1A-3) may be implemented for any cell using one of more of: (i) increasing the PRS bandwidth BW, (ii) increasing the number of subframes $N_{PRS}$ per PRS positioning occasion, (iii) reducing the periodicity $T_{PRS}$ between consecutive positioning occasions, (iv) increasing the number of separate PRS configurations supported in the cell, and (v) a transmission of PRS using an uplink carrier frequency.

Figure 6:
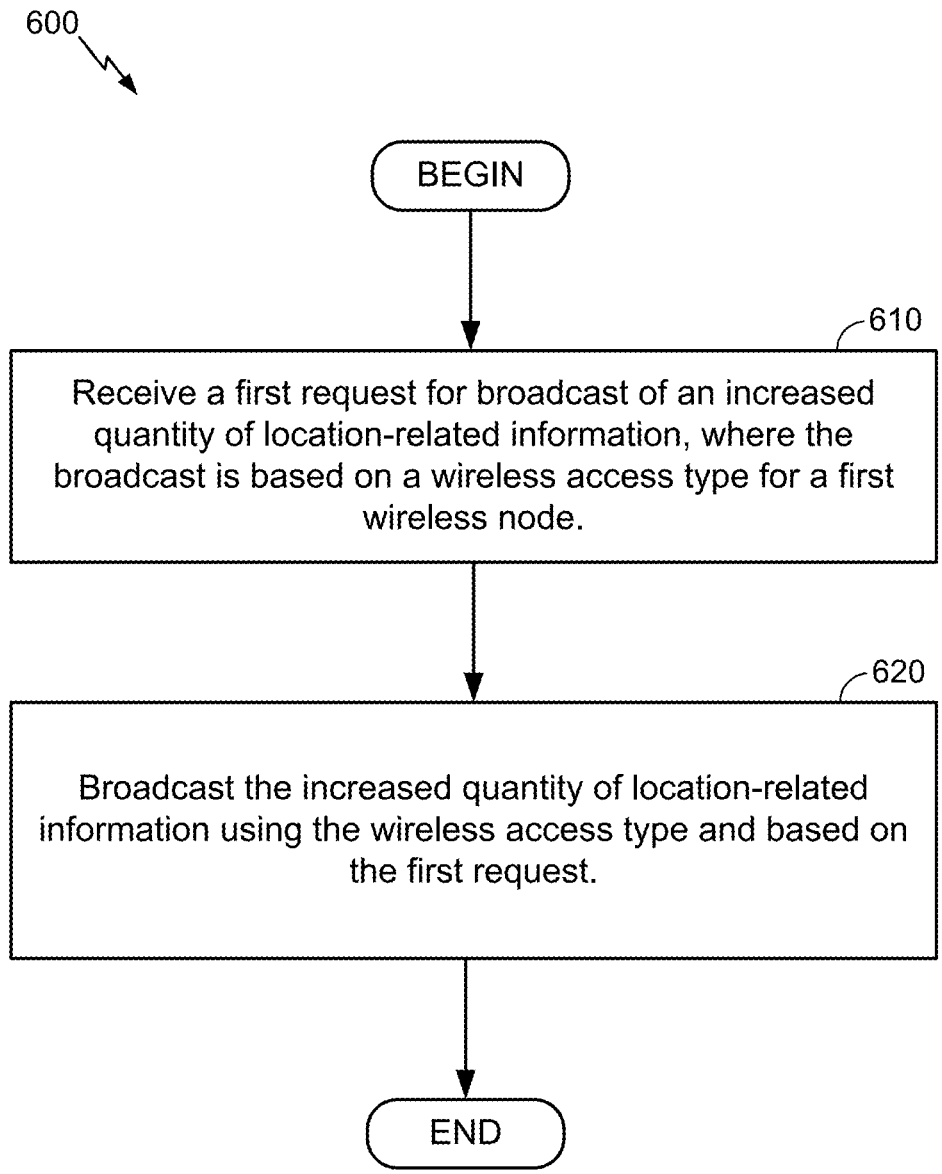
FIG. 6 is a flowchart of an example procedure, generally performed at a network node, to support location of a mobile device in accordance with the techniques and methods described herein.

FIG. 6 shows a flowchart of an example procedure 600, generally performed at a first wireless node, to support location of a user equipment (UE) such as the UE 105 in FIGS. 1A-3. The first wireless node may be a network node, base station, access point or positioning-only beacon such as a gNB 110, ng-eNB 114 or eNB configured to transmit radio signals, e.g., according to LTE, 5G or NR protocols. The first wireless node may be configured to adjust the quantity of resources allocated for location-related information (e.g., PRS signals, location assistance data provided in system information blocks (SIBs) that include information needed by UEs to access cells and/or perform positioning measurements, etc.)

The procedure 600 includes receiving at block 610 a first request for broadcast of an increased quantity of location-related information, where the broadcast is based on a wireless access type for the first wireless node. Non-limiting examples of wireless access types that may be used in the implementations described herein may include Fifth Generation (5G) wireless access, New Radio (NR) wireless access, Long Term Evolution (LTE) wireless access, IEEE 802.11 WiFi wireless access, etc.

In some embodiments, the first request is received from a UE (which may be similar to or the same as the UE 105 described in relation to FIGS. 1A-3), as at action 304 in FIG. 3. The first request may be received using a Radio Resource Control (RRC) protocol for the wireless access type. The first request may alternatively be received from a second wireless node, as at actions 305 and 306 in FIG. 3. This may occur in situations where the second wireless node is the serving node (e.g. serving BS) for the UE, and the UE has sent its initial request for increased resource allocation (for broadcasting of location-related information) to that second wireless node, which then sends a further request to the first wireless node. In such embodiments, the identity of the first wireless node, or the identity of a cell for the first wireless node, may have been determined by the UE (and thus specified in the request for the increased quantity of location-related information), or may have been determined by the second wireless node (e.g., based on information regarding the identities of the second wireless node's neighbors or based on the identities of reference and neighbor cells to be measured by the UE which were provided in the request sent by the UE to the second wireless node).

The first wireless node may be a serving wireless node (e.g., the gNB 110-1 of FIGS. 1A-3) for the UE (e.g. based on the wireless access type). As noted, in some implementations, having received the first request for the increased quantity of location-related information, the procedure 600 may further include sending a second request for broadcast of an increased quantity of location-related-information to a third wireless node for the wireless access type, with the second request being based on the first request. Thus, in one example, the first request may be received from the UE at block 610 and may indicate a number of cell IDs to be measured by the UE. In this example, the first wireless node may then send to additional wireless nodes corresponding to these cell IDs, requests to increase the resources allocated for broadcasting location-related information (as illustrated, for example, at actions 305 and 306 of FIG. 3).

With continued reference to FIG. 6, the procedure 600 further includes, at block 620, broadcasting the increased quantity of location-related information using the wireless access type and based on the first request. In some implementations, the increased quantity of location-related information may be an increase pre-configured in each wireless node (and not conveyed in detail) for the various resources allocated for broadcasting location-related information (e.g., increased bandwidth allocated to transmitting PRS signals, increased frequency or duration of PRS positioning occasions, and/or a transmission of PRS using an uplink carrier frequency). With such pre-configuration, the first request at block 610 and/or any second request sent to a third wireless node may request an increased quantity of location-related information but may not specify the exact increase, since this may be pre-configured in each wireless node. Alternatively, in some embodiments, the size of the increase may be specified (e.g. included as a requirement, an option or an alternative) in the first request received at block 610 and/or in any second request sent to a third wireless node. In a further example, the increase may be based on the number of UEs requesting an increased quantity of location-related information at block 610 at approximately the same time (e.g. during a period of 1 to 10 minutes) and/or on the priority of these requests. In this further example, the increased quantity of location-related information broadcast at block 620 and/or indicated in a second request sent to a third wireless node may be higher when a greater number of UEs have requested the increased quantity of location-related information and/or when the requests received from some UEs have higher priority (e.g. such as a request from a UE with an emergency call).

In some embodiments, the location-related information may comprise a Positioning Reference Signal (PRS), which may in some embodiments be referred to as a Tracking Reference Signal (TRS) or Cell-specific Reference Signal (CRS). In such embodiments, the increased quantity of location-related information may include one or more of, for example, an increased PRS bandwidth, an increased frequency of PRS positioning occasions, an increased duration for a PRS positioning occasion, an increased number of separate PRS signals (or separate PRS configurations), and/or a transmission of PRS using an uplink carrier frequency. As an example of increased PRS bandwidth for LTE, an increased number resource blocks, and/or an increased number of resource elements in each resource block, that contain the PRS signal may be allocated by a wireless node (e.g. by the first wireless node at block 620) to transmit the PRS. As an example of an increased number of separate PRS signals, a wireless node (e.g. the first wireless node at block 620) may transmit additional PRS signals with distinct characteristics such as a distinct carrier frequency, bandwidth, frequency shift, code sequence, duration, periodicity and/or muting sequence. As an example of a transmission of PRS using an uplink carrier frequency, a wireless node (e.g. the first wireless node at block 620) may transmit additional PRS signals using a radio frequency, bandwidth, duration and periodicity that is normally used by UEs for uplink transmission (e.g. with FDD). These embodiments may further include sending a third request for a muting of transmission to a fourth wireless node for the wireless access type, where the muting of transmission is based on avoiding radio interference with the broadcast of the increased quantity of location-related information by the first wireless node (and/or, for example, with broadcast of an increased quantity of location-related information by other wireless nodes). For example, the fourth wireless node may be determined by the first wireless node as belonging to a zone B 804, as described for FIG. 1B, in which the fourth wireless node and/or UEs served by the fourth wireless node perform muting of transmission corresponding to increased PRS transmission used by the first wireless node which may be part of a zone A 802 as described for FIG. 1B.

The location-related information may also include, in some embodiments, location assistance data. In such embodiments, the location assistance data may be broadcast by a wireless node (e.g. the first wireless node at block 620) using one or more System Information Blocks (SIBs). Further, the location assistance data in such embodiments may include, for example, assistance data for an Observed Time Difference of Arrival (OTDOA) position method, assistance data for an Assisted Global Navigation Satellite System (A-GNSS) position method, assistance data for a Real Time Kinematics (RTK) position method, assistance data for a Precise Point Positioning (PPP) position method, and/or assistance data for a Differential GNSS (DGNSS) position method. In such embodiments (pertaining to increasing the quantity of the location-related information), the increased quantity may include, for example, an increased quantity of location assistance data, additional types of location assistance data, an increased frequency of broadcasting location assistance data, and/or an increased repetition of broadcasting location assistance data. For example, in the case of assistance data for A-GNSS and/or RTK positioning, the increased quantity of location assistance data may include assistance data for an increased number of SVs (e.g. SVs 190), an increased number of SV signals and/or an increased number of GNSSs. Similarly for A-GNSS and/or RTK, the additional types of location assistance data may include, for example, acquisition assistance data, ephemeris data, real time integrity data, differential corrections, almanac data, data bit assistance, time models, RTK observations, and/or RTK bias information, where the additional types are broadcast as part of the increased quantity of location assistance data but may not be broadcast when the quantity of location assistance data is not increased.

As noted, in some embodiments, the duration of the interval of the broadcast of the increased quantity of location-related information by one or more wireless nodes (e.g., the first wireless node at block 620) may be determined based on the first request at block 610 and/or on requests received from other UEs and/or other wireless nodes. For example, the first request at block 610 may provide an indication of the length of time during which broadcast of the increased quantity of location-related information is needed. Accordingly, in such embodiments broadcasting the increased quantity of location-related information may include deriving, based, at least in part, on the first request for the increased quantity of the location-related information, a time duration during which the increased quantity of location-related information is broadcast. The time duration derived by the first wireless node may be based, in part, on the number of requests for an increased quantity of location-related information that are received by the first wireless node. For example, if the first wireless node receives multiple requests from different UEs (e.g. from UEs served by the first wireless node) and/or from other wireless nodes (e.g., other gNBs 110, ng-eNBs 114 or eNBs), the time duration derived may generally be longer. Upon the expiration of the derived time duration, a wireless node (e.g. the first wireless node) may be configured to stop broadcasting the increased quantity of location-related information, and return to broadcasting location-related information at a reduced resource allocation level (e.g. which may be a default level for broadcasting location-related information, such as PRS and/or location assistance data).

In some embodiments where the first request is received from a UE at block 610, the procedure 600 may further comprise sending a response to the UE by the first wireless node, where the response comprises a confirmation of the broadcasting of the increased quantity of location-related information by the first wireless node at block 620. The response may correspond, for example, to action 307 in FIG. 3. The response may indicate the exact increase in the quantity of location-related information broadcast by the first wireless node (and/or broadcast by other wireless nodes). The response may enable the UE to more easily acquire or measure the increased quantity of location-related information broadcast at block 620 and/or broadcast by other wireless nodes.

In some embodiments, once the UE no longer needs to receive the increased quantity of location-related information (e.g. because the UE has completed obtaining location related measurements based on the increased quantity of location-related information), the UE may cause the transmission of a request to terminate the broadcast of the increased quantity of location-related information. Accordingly, in such embodiments, the procedure 600 may also include receiving a fourth request from the UE at the first wireless node for a termination of the broadcast of the increased quantity of location-related information (e.g. as at action 312 in FIG. 3). In response to this fourth request, the first wireless node may terminate the broadcasting of the increased quantity of location-related information using the wireless access type and may, for example, begin broadcasting a reduced quantity of location-related information. The first wireless node may also or instead send a request to other wireless nodes to terminate the broadcasting of the increased quantity of location-related information (e.g. as at actions 313 and 314 in FIG. 3).

Figure 7:
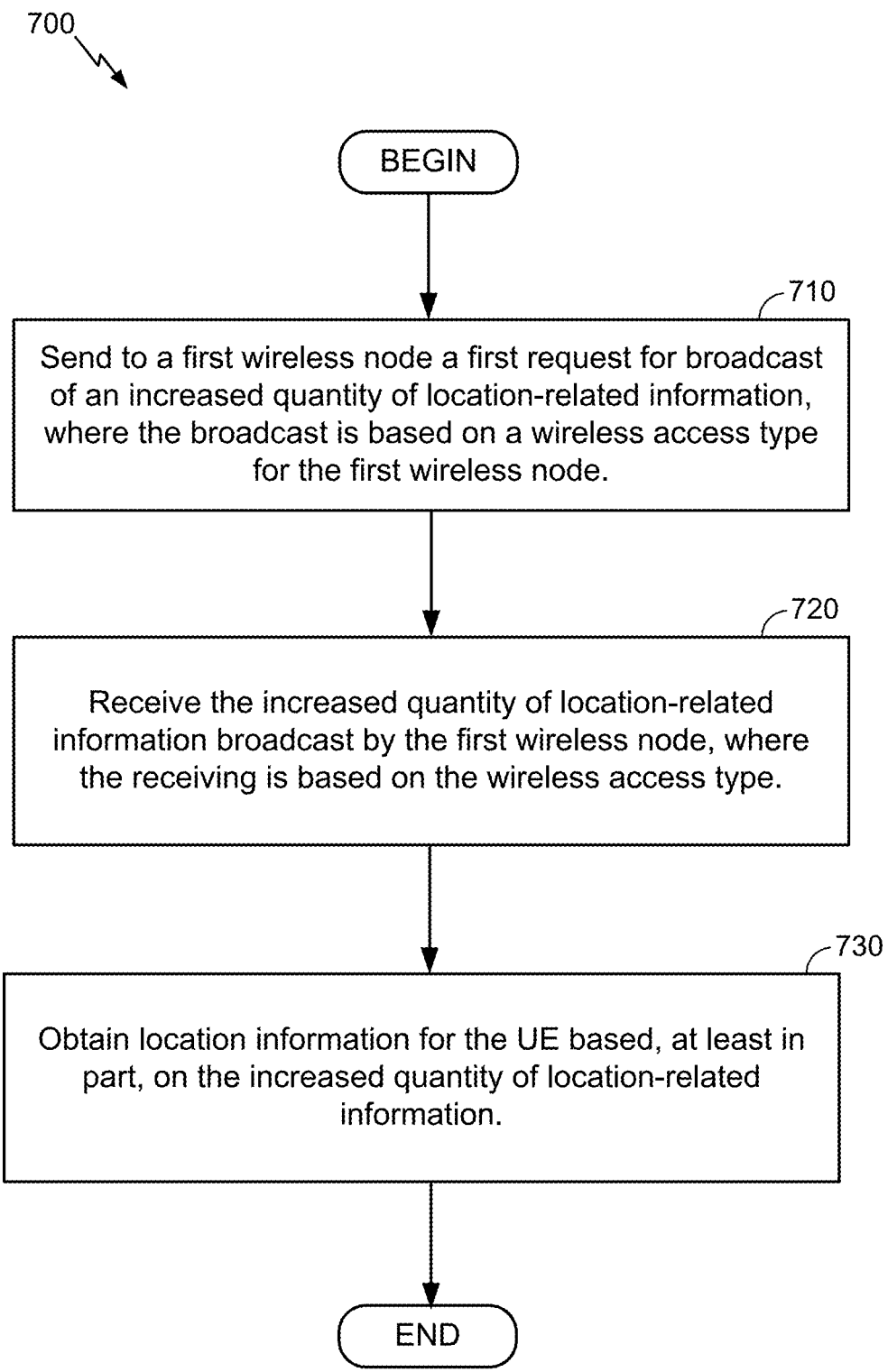
FIG. 7 is a flowchart of an example procedure, generally performed at a mobile device, to support location of the mobile device in accordance with the techniques and methods described herein.

FIG. 7 shows a flowchart of an example procedure 700, generally performed at a UE such as the UE 105 of FIGS. 1A-3, for supporting location determination. The procedure 700 includes sending at block 710 to a first wireless node (e.g., a serving wireless node for the UE based on the wireless access type such as gNB 110-1) a first request for broadcast of an increased quantity of location-related information. The broadcast may be based on (e.g., configured for) a wireless access type for the first wireless node. The first wireless access type may be a wireless access type for Fifth Generation (5G), New Radio (NR), Long Term Evolution (LTE) or IEEE 802.11 WiFi in some embodiments. In some embodiments, sending the first request may include sending the request using a Radio Resource Control (RRC) protocol for the wireless access type. As noted, in some embodiments, the first wireless node receiving the first request may be configured to generate and transmit subsequent requests (e.g. as at actions 305 and 306 in FIG. 3), which are based on the first request, to other wireless nodes, to cause these other wireless nodes to broadcast the increased quantity of location-related information to allow enhanced support of positioning functionality. The additional wireless nodes to which the subsequent requests may be sent may have been identified in the first request sent by the UE at block 710—e.g. by including in the first request the identities of cells to be measured by the UE. Block 710 may correspond to action 304 in FIG. 3 in some embodiments.

With continued reference to FIG. 7, the procedure 700 further includes receiving at block 720 the increased quantity of location-related information broadcast by the first wireless node, with the receiving based on the wireless access type. Thus, for example, the UE receives broadcasts of the increased quantity of location-related information from the first wireless node and optionally from additional wireless nodes, in embodiments, in which the original request was used to generate and transmit further requests from the first wireless node to those additional wireless nodes. The broadcast of the increased quantity of location-related information from the first wireless node (and/or from additional wireless nodes) may be received at block 720 for some time duration that may have been included by the UE in the first request sent at block 710 or may have been derived by the first wireless node (e.g. based on information included in the first request). In some embodiments, block 720 may correspond to action 308 and optionally actions 309 and 310 in FIG. 3.

With continued reference to FIG. 7, the procedure 700 further includes obtaining at block 730 location information for the UE based, at least in part, on the increased quantity of location-related information received at block 720. For example, when the increased quantity of location-related information broadcast by the first wireless node comprises PRS signals, the UE may obtain at least one location measurement (e.g. an RSTD or TOA measurement) for the first wireless node (and/or location measurements for other wireless nodes) based on measurement of the increased PRS signals. Alternatively, when the increased quantity of location-related information broadcast by the first wireless node comprises location assistance data, the UE may obtain location measurements for the first wireless node, for other wireless nodes and/or for other radio sources (e.g. SVs such as SVs 190) with the help of the increased quantity of location assistance data and/or may determine a location estimate for the UE, with the help of the increased quantity of location assistance data, based on these or other location measurements. Block 730 may correspond to action 311 in FIG. 3 in some embodiments.

In some embodiments, following sending of the first request for the broadcast of the increased quantity of location-related information at block 710, the UE may receive a response from the first wireless node, where the response comprises a confirmation of the broadcasting of the increased quantity of location-related information by the first wireless node (and possibly by other wireless nodes). The response may correspond, for example, to action 307 in FIG. 3. The response may indicate the exact increase in the quantity of location-related information broadcast by the first wireless node (and/or broadcast by other wireless nodes). The response may enable the UE to more easily receive the increased quantity of location-related information at block 720 and/or to obtain location information for the UE at block 720 based on the increased level of location-related information. For example, in the case of increased PRS transmission, the UE may receive exact configuration information for the increased PRS transmission which may more easily allow acquisition and measurement of the increased PRS transmission at blocks 720 and 730. Similarly, in the case of increased broadcast of location assistance data, the response may enable the UE to know at which additional times the increased location assistance data will be broadcast and/or which additional location assistance data will be included in the increased broadcast of location assistance data.

In some embodiments, following obtaining the location information for the UE at block 730, the UE sends a second request to the first wireless node for a termination of the broadcast of the increased quantity of location-related information.

As noted, in one embodiment, the location-related information for which a request is sent at block 710 and which is received at block 720 may include a positioning reference signals (PRS). In this embodiment, the increased quantity of the location-related information indicated in the first request at block 710 and/or received at block 720 may include an increased PRS bandwidth, an increased frequency of PRS positioning occasions, an increased duration for a PRS positioning occasion, an increased number of separate PRS signals (or separate PRS configurations), and/or a transmission of PRS using an uplink carrier frequency. As an example of increased PRS bandwidth for LTE, an increased number of resource blocks, and/or an increased number of resource elements in each resource block, that contain the PRS signal may be allocated by a wireless node (e.g. by the first wireless node) to transmit the PRS. As an example of an increased number of separate PRS signals, a wireless node (e.g. the first wireless node) may transmit additional PRS signals with distinct characteristics such as a distinct radio frequency, bandwidth, duration, periodicity, frequency shift, code sequence and/or muting sequence. As an example of a transmission of PRS using an uplink carrier frequency, a wireless node (e.g. the first wireless node) may transmit additional PRS signals using a radio frequency, bandwidth, duration and periodicity that is normally used by UEs for uplink transmission (e.g. with FDD).

In some embodiments, the location-related information may include location assistance data. In such embodiments, the location assistance data may be received from a wireless node (e.g. from the first wireless node at block 720) using one or more System Information Blocks (SIBs). In such embodiments, the location assistance data may comprise, for example, assistance data for an Observed Time Difference of Arrival (OTDOA) position method, assistance data for an Assisted Global Navigation Satellite System (A-GNSS) position method, assistance data for a Real Time Kinematics (RTK) position method, assistance data for a Precise Point Positioning (PPP) position method, and/or assistance data for a Differential GNSS (DGNSS) position method. When the location-related information includes assistance data, the increased quantity of the location-related information (e.g. requested at block 710 and/or received at block 720), may include an increased quantity of location assistance data, additional types of location assistance data, an increased frequency of broadcasting of location assistance data, and/or an increased repetition of the broadcasting of location assistance data. For example, the increased repetition of broadcast may enable reception of the assistance data at block 720 by the UE when the UE is remote from the first wireless node (e.g. at or near the edge of a cell coverage area for the first wireless node). For example, in the case of assistance data for A-GNSS and/or RTK positioning, the increased quantity of location assistance data may include assistance data for an increased number of SVs (e.g. SVs 190), an increased number of SV signals and/or an increased number of GNSSs. Similarly for A-GNSS and/or RTK, the additional types of location assistance data may include, for example, acquisition assistance data, ephemeris data, real time integrity data, differential corrections, almanac data, data bit assistance, time models, RTK observations, and/or RTK bias information, where the additional types are received by the UE as part of the increased quantity of location assistance data but may not be received by the UE when the quantity of location assistance data is not increased.

In some embodiments, the procedure 700 may further include receiving an increased quantity of location-related information broadcast by a second wireless node, where the increased quantity of location-related information received from the second wireless node is based on the first request and on the wireless access type. These embodiments may arise, for example, when the first wireless node that received the first request sent at block 710 communicates a subsequent request to the second wireless node to cause the second wireless node to increase the quantity of location-related information broadcast by the second wireless node. These embodiments may correspond to actions 309 and 310 in FIG. 3.

Figure 8:
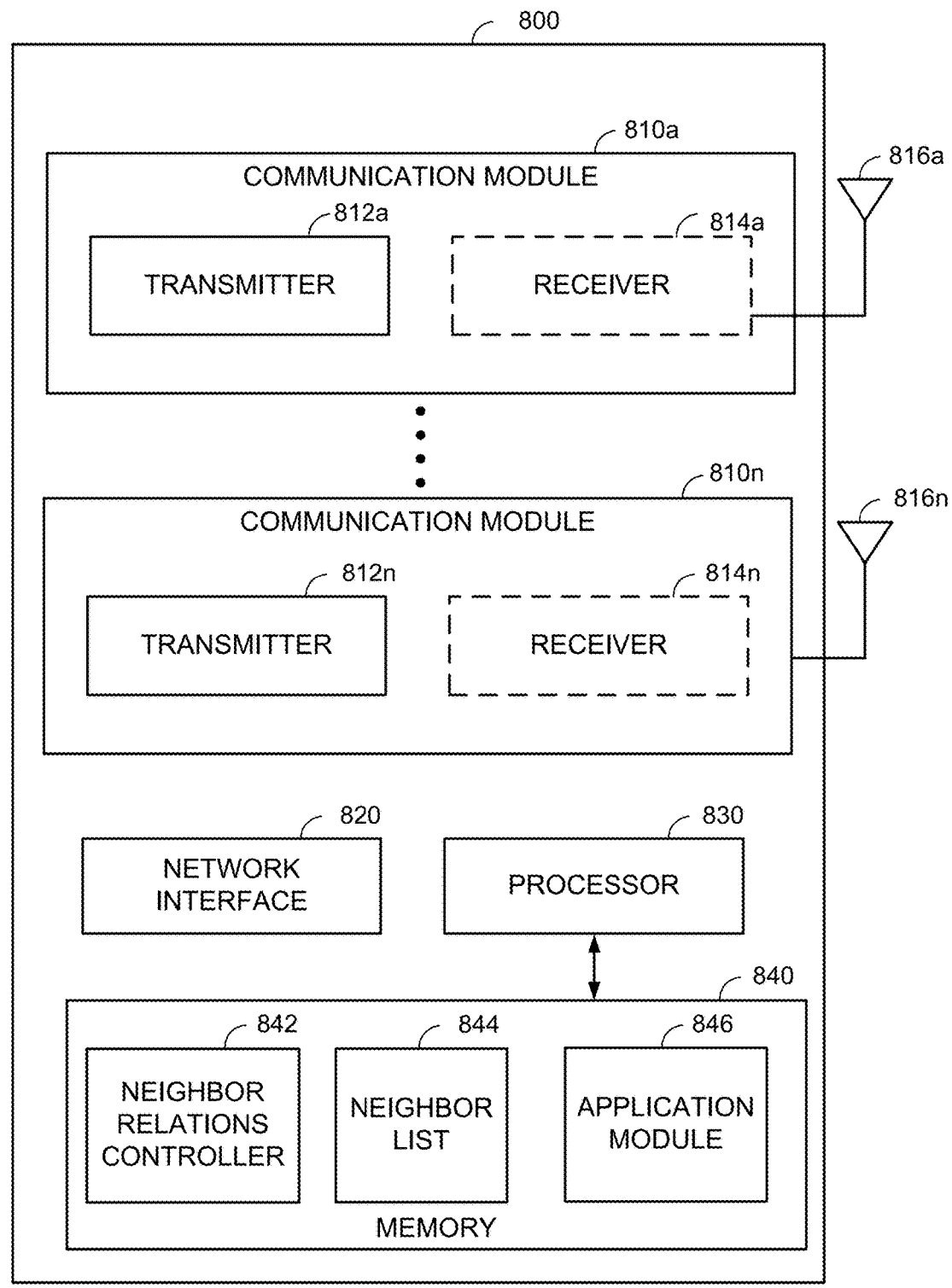
FIG. 8 is a schematic diagram of an example wireless node (such as a base station, access point, or server).

FIG. 8 shows a schematic diagram of an example wireless node 800, such as a base station, access point, or server, which may be similar to, and be configured to have a functionality similar to that, of any of the various nodes depicted or described, for example, with reference to FIGS. 1A-3 (e.g., the gNBs 110-1, 110-2, 110-3, an ng-eNB 114, an eNB, an LMF 120, other components of the 5GC 140). The wireless node 800 may include one or more communication modules 810a-n electrically coupled to one more antennas 816a-n for communicating with wireless devices, such as, for example, the UE 105 of FIGS. 1A-3. The each of the communication modules 810a-810n may include a respective transmitter 812a-n for sending signals (e.g., downlink messages and signals, which may be arranged in frames, and which may include positioning reference signals and/or assistance data whose quantity may be controlled/varied as described herein) and, optionally (e.g., for nodes configured to receive and process uplink communications) a respective receiver 814a-n. In embodiments in which the implemented node includes both a transmitter and a receiver, the communication module comprising the transmitter and receiver may be referred to as a transceiver. The node 800 may also include a network interface 820 to communicate with other network nodes (e.g., sending and receiving queries and responses). For example, each network element may be configured to communicate (e.g., via wired or wireless backhaul communication) with a gateway, or other suitable device of a network, to facilitate communication with one or more core network nodes (e.g., any of the other nodes and elements shown in FIGS. 1A-3). Additionally, and/or alternatively, communication with other network nodes may also be performed using the communication modules 810a-n and/or the respective antennas 816a-n.

The node 800 may also include other components that may be used with embodiments described herein. For example, the node 800 may include, in some embodiments, a processor (also referred to as a controller) 830 to manage communications with other nodes (e.g., sending and receiving messages), to generate communication signals (including to generate communication frames, signals and/or messages with adjustable quantities of resources that are allocated for location-related information such as PRS transmissions and assistance data transmissions), and to provide other related functionality, including functionality to implement the various processes and methods described herein. Thus, for example, the processor 830, in combination with other modules/units of the node 800, may be configured to receive a first request for broadcast of an increased quantity of location-related information, with the broadcast based on a wireless access type for the wireless node 800, and to broadcast the increased quantity of location-related information using the wireless access type and based on the first request.

The processor 830 may be coupled to (or may otherwise communicate with) a memory 840, which may include one or more modules (implemented in hardware of software) to facilitate controlling the operation of the node 800. For example, the memory 840 may include an application module 846 with computer code for various applications required to perform the operations of the node 800. For example, the processor 830 may be configured (e.g., using code provided via the application module 846, or some other module in the memory 840) to control the operation of the antennas 816*a-n*) so as to adjustably control the antennas' transmission power and phase, gain pattern, antenna direction (e.g., the direction at which a resultant radiation beam from the antennas 816*a-n* propagates), antenna diversity, and other adjustable antenna parameters for the antennas 816*a-n* of the node 800. In some embodiments, the antennas' configuration may be controlled according to pre-stored configuration data provided at the time of manufacture or deployment of the node 800, or according to data obtained from a remote device (such as a central server sending data representative of the antenna configuration, and other operational parameters, that are to be used for the node 800). The wireless node 800 may also be configured, in some implementations, to perform location data services, or performs other types of services, for multiple wireless devices (clients) communicating with the wireless node 800 (or communicating with a server coupled to the wireless node 800), and to provide location data and/or assistance data to such multiple wireless devices.

In addition, in some embodiments, the memory 840 may also include neighbor relations controllers (e.g., neighbor discovery modules) 842 to manage neighbor relations (e.g., maintaining a neighbor list 844) and to provide other related functionality. For example, the neighbor relations controller 842 may be configured to determine neighboring wireless nodes to which requests may be sent to increase the respective quantities of location-related information that those determined neighboring nodes are to communicate (broadcast). In some embodiments, the node 800 may also include one or more sensors (not shown in FIG. 8) and other devices (e.g., cameras).

Figure 9:
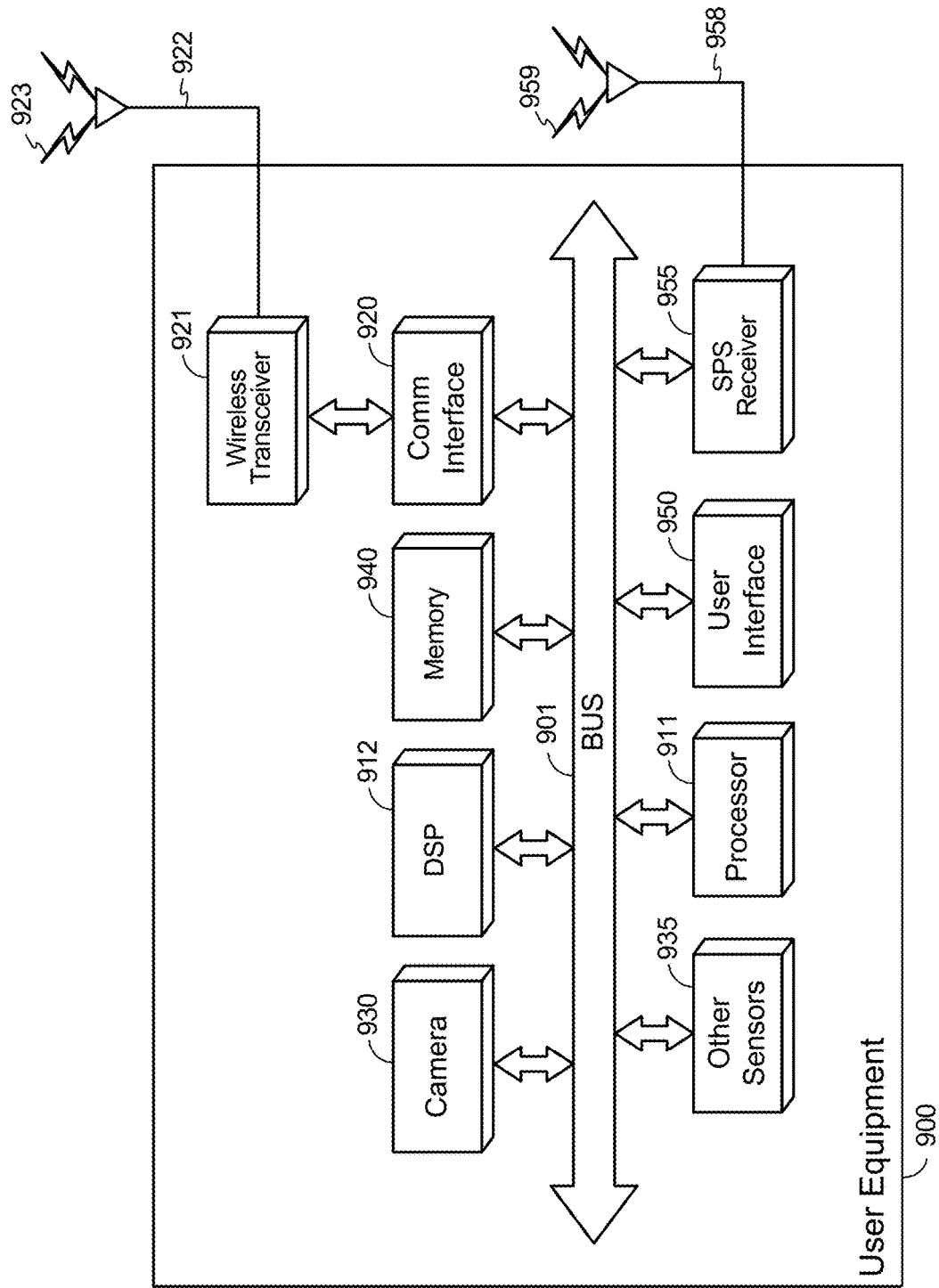
FIG. 9 is a schematic diagram of a mobile device.

FIG. 9 shows a user equipment (UE) 900 for which various procedures and techniques described herein can be utilized. The UE 900 may be similar or identical, in implementation and/or functionality, to any of the other UEs described herein, including the UE 105 depicted in FIGS. 1A-3 and the UE referred to for FIGS. 6 and 7. Furthermore, the implementation illustrated in FIG. 9 may also be used to implement, at least in part, some of the nodes and devices illustrated throughout the present disclosure, including such nodes and devices and the base stations (e.g. gNBs 110, ng-eNB 114, etc.), location servers, and other components and devices illustrated in FIGS. 1A-3 and FIG. 8.

The UE 900 includes a processor 911 (or processor core) and memory 940. As described herein, the UE 900 is configured to, for example request an increased quantity of location-related information to be provided (e.g., broadcast) by a serving wireless node, and/or by other wireless nodes (as may be determined by the UE 900 or by the wireless node to which it sends the request). The UE 900 is further configured to receive and utilize (e.g., for positioning functionality) the requested increased quantity of location-related information. The UE 900 may optionally include a trusted environment operably connected to the memory 940 by a public bus 901 or a private bus (not shown). The UE 900 may also include a communication interface 920 and a wireless transceiver 921 configured to send and receive wireless signals 923 (which may include LTE, NR, 5G or WiFi wireless signals) via a wireless antenna 922 over a wireless network (such as the communication system 100 of FIG. 1A). The wireless transceiver 921 is connected to the bus 901 via the communication interface 920. Here, the UE 900 is illustrated as having a single wireless transceiver 921. However, the UE 900 can alternatively have multiple wireless transceivers 921 and/or multiple wireless antennas 922 to support multiple communication standards such as WiFi, CDMA, Wideband CDMA (WCDMA), Long Term Evolution (LTE), 5G, NR, Bluetooth® short-range wireless communication technology, etc.

The communication interface 920 and/or wireless transceiver 921 may support operations on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, control information, overhead information, data, etc.

The UE 900 may also include a user interface 950 (e.g., display, graphical user interface (GUI), touchscreen, keyboard, microphone, speaker), and a Satellite Positioning System (SPS) receiver 955 that receives SPS signals 959 (e.g., from SPS satellites) via an SPS antenna 958 (which may be the same antenna as wireless antenna 922, or may be different). The SPS receiver 955 can communicate with a single global navigation satellite system (GNSS) or multiple such systems. A GNSS can include, but is not limited to, Global Positioning System (GPS), Galileo, Glonass, Beidou (Compass), etc. SPS satellites are also referred to as satellites, space vehicles (SVs), etc. The SPS receiver 955 measures the SPS signals 959 and may use the measurements of the SPS signals 959 to determine the location of the UE 900. The processor 911, memory 940, Digital Signal Processor (DSP) 912 and/or specialized processor(s) (not shown) may also be utilized to process the SPS signals 959, in whole or in part, and/or to compute (approximately or more precisely) the location of the UE 900, in conjunction with SPS receiver 955. Alternatively, the UE 900 may support transfer of the SPS measurements to a location server (e.g., E-SMLC, an LMF, such as the LMF 120 of FIG. 1A, etc.) that computes the UE location instead. Storage of information from the SPS signals 959 or other location signals is performed using a memory 940 or registers (not shown). While only one processor 911, one DSP 912 and one memory 940 are shown in FIG. 9, more than one of any, a pair, or all of these components could be used by the UE 900. The processor 911 and the DSP 912 associated with the UE 900 are connected to the bus 901.

The memory 940 can include a non-transitory computer-readable storage medium (or media) that stores functions as one or more instructions or code. Media that can make up the memory 940 include, but are not limited to, RAM, ROM, FLASH, disc drives, etc. In general, the functions stored by the memory 940 are executed by general-purpose processor (s), such as the processor 911, specialized processors, such as the DSP 912, etc. Thus, the memory 940 is a processor-readable memory and/or a computer-readable memory that stores software (programming code, instructions, etc.) configured to cause the processor(s) 911 and/or DSP(s) 912 to perform the functions described (e.g. the functions described previously for the example procedure 700 of FIG. 7). Alternatively, one or more functions of the UE 900 may be performed in whole or in part in hardware.

A UE 900 can estimate its current position within an associated system using various techniques, based on other communication entities within radio range and/or information available to the UE 900. For instance, the UE 900 can estimate its position using information obtained from: base stations and access points (APs) associated with one or more wireless wide area networks (WWANs), wireless local area networks (WLANs), personal area networks (PANs) utilizing a short-range wireless communication technology such as Bluetooth® wireless technology or ZIGBEE®, etc.; Global Navigation Satellite System (GNSS) or other Satellite Positioning System (SPS) satellites; and/or map data obtained from a map server or other server (e.g., an LMF, an E-SMLC or SLP). In some cases, a location server, which may be an E-SMLC, SLP, Standalone Serving Mobile Location Center (SAS), an LMF, etc., may provide assistance data to the UE 900 to allow or assist the UE 900 to acquire signals (e.g., signals from WWAN base stations, signals from WLAN APs, signals from cellular base stations, GNSS satellites, etc.) and make location-related measurements using these signals. The UE 900 may then provide the measurements to the location server to compute a location estimate (which may be known as "UE assisted" positioning) or may compute a location estimate itself (which may be known as "UE based" positioning) based on the measurements and possibly based also on other assistance data provided by the location server (e.g. such as orbital and timing data for GNSS satellites, configuration parameters for the PRS signals, the precise location coordinates of WLAN APs and/or cellular base stations, etc.)

In some embodiments, the UE 900 may include a camera 930 (e.g., front and/or back facing) such as, for example, complementary metal-oxide-semiconductor (CMOS) image sensors with appropriate lens configurations. Other imaging technologies such as charge-coupled devices (CCD) and back side illuminated CMOS may be used. The camera 930 may be configured to obtain and provide image information to assist in positioning of the UE 900. In an example, one or more external image processing servers (e.g., remote servers) may be used to perform image recognition and provide location estimation processes. The UE 900 may include other sensors 935 which may also be used to compute, or used to assist in computing, a location for the UE 900. The sensors 935 may include inertial sensors (e.g., accelerometers, gyroscopes, magnetometers, a compass, any of which may be implemented based on micro-electro-mechanical-system (MEMS), or based on some other technology), as well as a barometer, thermometer, hygrometer and other sensors.

As noted, in some embodiments the UE may be configured to request and receive (e.g., via the wireless transceiver 921), communication signals (e.g. broadcast subframes) that are controlled/configured to increase the quantity of location-related information. For example, the increased quantity of location-related information may be achieved by increasing (at the wireless nodes communicating with the UE) the bandwidth of PRS, increasing the frequency and/or duration of PRS positioning occasions, increasing the quantity of assistance data, increasing the frequency of transmitting assistance data, transmitting PRS using an uplink carrier frequency, etc.

Substantial variations may be made in accordance with specific desires. For example, customized hardware might also be used, and/or particular elements might be implemented in hardware, software (including portable software, such as applets, etc.), or both. Further, connection to other computing devices such as network input/output devices may be employed.

Configurations may be described as a process which is depicted as a flow diagram or block diagram. Although each may describe the operations as a sequential process, many of the operations can be performed in parallel or concurrently. In addition, the order of the operations may be rearranged.

A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate in the context of the systems, devices, circuits, methods, and other implementations described herein.

As used herein, including in the claims, "or" as used in a list of items prefaced by "at least one of" or "one or more of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.). Also, as used herein, unless otherwise stated, a statement that a function or operation is "based on" an item or condition means that the function or operation is based on the stated item or condition and may be based on one or more items and/or conditions in addition to the stated item or condition.

As used herein, a mobile device, user equipment (UE), or mobile station (MS) refers to a device such as a cellular or other wireless communication device, a smartphone, tablet, personal communication system (PCS) device, personal navigation device (PND), Personal Information Manager (PIM), Personal Digital Assistant (PDA), laptop or other suitable mobile device which is capable of receiving wireless communication and/or navigation signals, such as navigation positioning signals. The term "mobile station" (or "mobile device". "wireless device" or "user equipment") is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, a "mobile station" or "user equipment" is intended to include all devices, including wireless communication devices, computers, laptops, tablet devices, etc., which are capable of communication with a server, such as via the Internet, WiFi, or other network, and to communicate with one or more types of nodes, regardless of whether satellite signal reception, assistance data reception, and/or position-related processing occurs at the device, at a server, or at another device or node associated with the network. Any operable combination of the above are also considered a "mobile station" or "user equipment." A mobile device or user equipment (UE) may also be referred to as a mobile terminal, a terminal, a device, a Secure User Plane Location Enabled Terminal (SET), a target device, a target, or by some other name.

In an embodiment, a first example independent claim may include a method for supporting location of a user equipment (UE) at a first wireless node, comprising receiving a first request for broadcast of an increased quantity of location-related information, the broadcast based on a wireless access type for the first wireless node; and broadcasting the increased quantity of location-related information using the wireless access type and based on the first request.

Example dependent claims may include one or more of the following features. The wireless access type is Fifth Generation (5G), New Radio (NR) or Long Term Evolution (LTE). The location-related information comprises a Positioning Reference Signal (PRS). The increased quantity of location-related information comprises an increased PRS bandwidth, an increased frequency of PRS positioning occasions, an increased duration for a PRS positioning occasion, an increased number of separate PRS signals, a transmission of PRS using an uplink carrier frequency, or some combination thereof. The method may further include sending a second request for a muting of transmission to a second wireless node for the wireless access type, wherein the muting of transmission is based on avoiding radio interference with the broadcast of the increased quantity of location-related information by the first wireless node. The location-related information may comprise location assistance data. The location assistance data may comprise assistance data for Observed Time Difference Of Arrival (OTDOA), assistance data for Assisted Global Navigation Satellite System (A-GNSS), assistance data for Real Time Kinematics (RTK), assistance data for Precise Point Positioning (PPP), assistance data for Differential GNSS (DGNSS), or any combination thereof. The increased quantity of location-related information may comprise an increased quantity of location assistance data, additional types of location assistance data, an increased frequency of broadcasting location assistance data, an increased repetition of the broadcasting of the location assistance data, or any combination thereof. The first request may be received from a third wireless node. The first request may be received from the UE. The first request may be received using a Radio Resource Control (RRC) protocol for the wireless access type. The first wireless node may be a serving wireless node for the UE based on the wireless access type. The method may further include sending a third request for the broadcast of an increased quantity of location-related information to a fourth wireless node for the wireless access type, wherein the third request is based on the first request. The method may further include sending a response to the UE, wherein the response comprises a confirmation of the broadcasting of the increased quantity of location-related information by the first wireless node. The method may further include receiving a fourth request from the UE for a termination of the broadcast of the increased quantity of location-related information, and terminating the broadcasting of the increased quantity of location-related information using the wireless access type based on the fourth request.

In an embodiment, a second example independent claim may include a wireless node to support location of a user equipment (UE), the wireless node comprising one or more processors, and a transceiver, coupled to the one or more processors, configured to receive a first request for broadcast of an increased quantity of location-related information, the broadcast based on a wireless access type for the wireless node, and broadcast the increased quantity of location-related information using the wireless access type and based on the first request.

In an embodiment, a third example independent claim may include an apparatus to support location of a user equipment (UE), the apparatus comprising means for receiving a first request for broadcast of an increased quantity of location-related information, the broadcast based on a wireless access type for a first wireless node, and means for broadcasting the increased quantity of location-related information using the wireless access type and based on the first request.

In an embodiment, a fourth example independent claim may include a non-transitory computer readable media, to support location of a user equipment (UE), programmed with instructions, executable on a processor, to receive a first request for broadcast of an increased quantity of location-related information, the broadcast based on a wireless access type for a first wireless node, and broadcast the increased quantity of location-related information using the wireless access type and based on the first request.

While some of the techniques, processes, and/or implementations presented herein may comply with all or part of one or more standards, such techniques, processes, and/or implementations may not, in some embodiments, comply with part or all of such one or more standards.

Although particular embodiments have been disclosed herein in detail, this has been done by way of example for purposes of illustration only, and is not intended to be limiting with respect to the scope of the appended claims, which follow. In particular, it is contemplated that various substitutions, alterations, and modifications may be made without departing from the spirit and scope of the invention as defined by the claims. Other aspects, advantages, and modifications are considered to be within the scope of the following claims. The claims presented are representative of the embodiments and features disclosed herein. Other unclaimed embodiments and features are also contemplated. Accordingly, other embodiments are within the scope of the following claims.

What is claimed is:

1. A method for supporting location at a user equipment (UE), comprising:
    sending to a first wireless node a first request for broadcast of an increased quantity of location-related information, the broadcast based on a wireless access type for the first wireless node;
    receiving the increased quantity of location-related information broadcast by the first wireless node, the receiving based at least in part on the wireless access type;
    obtaining location information for the UE based, at least in part, on the increased quantity of location-related information; and
    sending a second request to the first wireless node for a termination of the broadcast of the increased quantity of location-related information after the location information is obtained.

2. The method of claim 1, wherein the wireless access type is Fifth Generation (5G), New Radio (NR) or Long Term Evolution (LTE).

3. The method of claim 2, wherein the location-related information comprises a Positioning Reference Signal (PRS).

4. The method of claim 3, wherein the increased quantity of location-related information comprises an increased PRS bandwidth, an increased frequency of PRS positioning occasions, an increased duration for a PRS positioning occasion, an increased number of separate PRS signals, a transmission of PRS using an uplink carrier frequency, or any combination thereof.

5. The method of claim 2, wherein the location-related information comprises location assistance data.

6. The method of claim 5, wherein the location assistance data comprises assistance data for one or more of: Observed Time Difference Of Arrival (OTDOA), Assisted Global Navigation Satellite System (A-GNSS), Real Time Kinematics (RTK), Precise Point Positioning (PPP), Differential GNSS (DGNSS), or any combination thereof.

7. The method of claim 5, wherein the increased quantity of location-related information comprises an increased quantity of location assistance data, additional types of location assistance data, an increased frequency of broadcasting of location assistance data, an increased repetition of the broadcasting of location assistance data, or any combination thereof.

8. The method of claim 1, wherein the first wireless node is a serving wireless node for the UE based on the wireless access type.

9. The method of claim 8, wherein the first request is sent using a Radio Resource Control (RRC) protocol for the wireless access type.

10. The method of claim 1 and further comprising:
receiving a response from the first wireless node, wherein the response comprises a confirmation of the broadcasting of the increased quantity of location-related information by the first wireless node.

11. The method of claim 1 and further comprising:
receiving an increased quantity of location-related information broadcast by a second wireless node, wherein the increased quantity of location-related information received from the second wireless node is based on the first request and on the wireless access type.

12. The method of claim 1, wherein the location information for the UE comprises at least one of a location measurement for the first wireless node or a location estimate for the UE.

13. A mobile wireless device comprising:
one or more processors; and
a transceiver, coupled to the one or more processors, configured to:
send to a first wireless node a first request for broadcast of an increased quantity of location-related information, the broadcast based on a wireless access type for the first wireless node;
receive the increased quantity of location-related information broadcast by the first wireless node, the received increased quantity being based at least in part on the wireless access type;
obtain location information for the mobile wireless device based, at least in part, on the increased quantity of location-related information; and
send a second request to the first wireless node for a termination of the broadcast of the increased quantity of location-related information after the location information is obtained.

14. The mobile wireless device of claim 13, wherein the wireless access type is Fifth Generation (5G), New Radio (NR) or Long Term Evolution (LTE).

15. The mobile wireless device of claim 14, wherein the location-related information comprises a Positioning Reference Signal (PRS).

16. The mobile wireless device of claim 15, wherein the increased quantity of location-related information comprises an increased PRS bandwidth, an increased frequency of PRS positioning occasions, an increased duration for a PRS positioning occasion, an increased number of separate PRS signals, a transmission of PRS using an uplink carrier frequency, or any combination thereof.

17. The mobile wireless device of claim 14, wherein the location-related information comprises location assistance data.

18. The mobile wireless device of claim 17, wherein the location assistance data comprises assistance data for one or more of: Observed Time Difference Of Arrival (OTDOA), Assisted Global Navigation Satellite System (A-GNSS), Real Time Kinematics (RTK), Precise Point Positioning (PPP), Differential GNSS (DGNSS), or any combination thereof.

19. The mobile wireless device of claim 17, wherein the increased quantity of location-related information comprises an increased quantity of location assistance data, additional types of location assistance data, an increased frequency of broadcasting of location assistance data, an increased repetition of the broadcasting of location assistance data, or any combination thereof.

20. The mobile wireless device of claim 13, wherein the first wireless node is a serving wireless node for the mobile wireless device based on the wireless access type.

21. The mobile wireless device of claim 20, wherein the first request is sent using a Radio Resource Control (RRC) protocol for the wireless access type.

22. The mobile wireless device of claim 13 wherein the one or more processors are further configured to:
receive a response from the first wireless node, wherein the response comprises a confirmation of the broadcasting of the increased quantity of location-related information by the first wireless node.

23. The mobile wireless device of claim 13 wherein the one or more processors are further configured to:
receive an increased quantity of location-related information broadcast by a second wireless node, wherein the increased quantity of location-related information received from the second wireless node is based on the first request and on the wireless access type.

24. The mobile wireless device of claim 13, wherein the location information comprises at least one of a location measurement for the first wireless node or a location estimate for the mobile wireless device.

25. An apparatus for supporting location at a user equipment (UE), the apparatus comprising:
means for sending to a first wireless node a first request for broadcast of an increased quantity of location-related information, the broadcast based on a wireless access type for the first wireless node;
means for receiving the increased quantity of location-related information broadcast by the first wireless node, the received increased quantity being based at least in part on the wireless access type;
means for obtaining location information for the UE based, at least in part, on the increased quantity of location-related information; and
means for sending a second request to the first wireless node for a termination of the broadcast of the increased quantity of location-related information after the location information is obtained.

26. The apparatus of claim 25, wherein the wireless access type is Fifth Generation (5G), New Radio (NR) or Long Term Evolution (LTE).

27. The apparatus of claim 26, wherein the location-related information comprises a Positioning Reference Signal (PRS).

28. A non-transitory computer readable media, for supporting location at a user equipment (UE), programmed with instructions, executable on a processor, to:
send to a first wireless node a first request for broadcast of an increased quantity of location-related information, the broadcast based on a wireless access type for the first wireless node;
receive the increased quantity of location-related information broadcast by the first wireless node, the received increased quantity being based at least in part on the wireless access type;
obtain location information for the UE based, at least in part, on the increased quantity of location-related information; and
send a second request to the first wireless node for a termination of the broadcast of the increased quantity of location-related information after the location information is obtained.

* * * * *